(12) United States Patent
Zhamu et al.

(10) Patent No.: US 10,826,113 B2
(45) Date of Patent: Nov. 3, 2020

(54) ZINC ION-EXCHANGING ENERGY STORAGE DEVICE

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 263 days.

(21) Appl. No.: 14/545,240

(22) Filed: Apr. 13, 2015

(65) Prior Publication Data

US 2016/0301096 A1 Oct. 13, 2016

(51) Int. Cl.
*H01M 10/054* (2010.01)
*H01M 4/583* (2010.01)
(Continued)

(52) U.S. Cl.
CPC .......... H01M 10/054 (2013.01); H01G 11/02 (2013.01); H01G 11/24 (2013.01); H01G 11/30 (2013.01); H01G 11/36 (2013.01); H01G 11/62 (2013.01); H01M 4/38 (2013.01); H01M 4/50 (2013.01); H01M 4/583 (2013.01); H01M 10/0568 (2013.01); H01M 10/0569 (2013.01); *H01G 11/04* (2013.01); *H01G 11/60* (2013.01); *H01M 4/42* (2013.01); *H01M 4/502* (2013.01); *H01M 4/505* (2013.01);
(Continued)

(58) Field of Classification Search
CPC .......... H01M 4/38; H01M 4/50; H01M 4/583; H01M 4/42
See application file for complete search history.

(56) References Cited

U.S. PATENT DOCUMENTS 4,492,744 A * 1/1985 Brown .................. H01M 4/244
429/217
6,187,475 B1 2/2001 Oh et al.
(Continued)

OTHER PUBLICATIONS

Wei et al., Preparation and characterization of manganese dioxides with nano-sized tunnel structures for zinc ion storage, Journal of Physics and Chemistry of Solids 73 (2012) 1487-1491.*
(Continued)

*Primary Examiner* — Lucas J. O'Donnell

(57) ABSTRACT

A zinc ion-exchanging battery device comprising: (A) a cathode comprising two cathode active materials (a zinc ion intercalation compound and a surface-mediating material); (B) an anode containing zinc metal or zinc alloy; (C) a porous separator disposed between the cathode and the anode; and (D) an electrolyte containing zinc ions that are exchanged between the cathode and the anode during battery charge/discharge. The zinc ion intercalation compound is selected from chemically treated carbon or graphite material having an expanded inter-graphene spacing $d_{002}$ of at least 0.5 nm, or an oxide, carbide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof. The surface-mediating material contains exfoliated graphite or multiple single-layer sheets or multi-layer platelets of a graphene material.

20 Claims, 12 Drawing Sheets

(51) Int. Cl.

| | | |
|---|---|---|
| *H01M 4/50* | (2010.01) | |
| *H01M 10/0568* | (2010.01) | |
| *H01M 10/0569* | (2010.01) | |
| *H01M 4/38* | (2006.01) | |
| *H01G 11/62* | (2013.01) | |
| *H01G 11/36* | (2013.01) | |
| *H01G 11/24* | (2013.01) | |
| *H01G 11/02* | (2013.01) | |
| *H01G 11/30* | (2013.01) | |
| *H01M 4/505* | (2010.01) | |
| *H01M 4/42* | (2006.01) | |
| *H01G 11/60* | (2013.01) | |
| *H01G 11/04* | (2013.01) | |

(52) U.S. Cl.
CPC ........... *H01M 2300/0002* (2013.01); *H01M 2300/0028* (2013.01); *H01M 2300/0045* (2013.01)

(56) References Cited

U.S. PATENT DOCUMENTS

| | | |
|---|---|---|
| 7,071,258 B1 | 7/2006 | Jang et al. |
| 8,663,844 B2 | 3/2014 | Kang et al. |
| 2001/0024749 A1* | 9/2001 | Michot ............... B01J 31/0215 |
| | | 429/122 |
| 2005/0271574 A1 | 12/2005 | Jang et al. |
| 2008/0048152 A1 | 2/2008 | Jang et al. |
| 2009/0246625 A1* | 10/2009 | Lu ..................... H01M 4/133 |
| | | 429/207 |
| 2011/0223480 A1* | 9/2011 | Wee .................... B82Y 30/00 |
| | | 429/218.1 |
| 2012/0171574 A1* | 7/2012 | Zhamu ................ H01M 4/13 |
| | | 429/300 |
| 2013/0319870 A1* | 12/2013 | Chen .................. H01M 4/133 |
| | | 205/86 |
| 2015/0210044 A1* | 7/2015 | Barsoum ............... C01B 21/06 |
| | | 429/231.8 |
| 2015/0287988 A1* | 10/2015 | Xu ...................... H01M 4/42 |
| | | 429/188 |

OTHER PUBLICATIONS

Warren, "X-Ray Study of the Graphitization of Carbon Black", Proceedings of the Conferences on Carbon, https://www.ems.psu.edu/~radovic/1955/papers/1955_49.PDF (Year: 1955).*

Kundu et al, Nature Energy, Aug. 26, 2016, Article No. 16119, DOI: 10.1038/NENERGY.2016.119 (Year: 2016).*

Le et al., Intercalation of Polyvalent Cations into V2O5 Aerogels, Chem. Mater. 1998, 10, 682-684 (Year: 1998).*

U.S. Appl. No. 10/858,814, filed Jun. 3, 2004, B. Z. Jang, et al.

U.S. Appl. No. 11/509,424, filed Aug. 25, 2006, B. Z. Jang, et al.

* cited by examiner

FIG. 4   500 nm

ZINC ION-EXCHANGING ENERGY STORAGE DEVICE

FIELD OF THE INVENTION

The present invention is directed at a new type of energy storage device, herein referred to as the zinc ion-exchanging battery device wherein the operation of the cathode depends upon a combination of both zinc ion intercalation (i.e. zinc ion diffusion in and out of the bulk of a solid electrode-active material) and zinc ion surface storage ("surface-mediated" or "surface-enabled"). This device has exceptionally high energy density and power density.

BACKGROUND OF THE INVENTION

Supercapacitors and lithium-ion batteries are two promising energy storage devices for electric vehicle applications. However, supercapacitors, albeit delivering a high power density (e.g. up to 8 kW/kg), are incapable of storing a high amount of energy per unit cell weight (e.g. typically, 5-8 Wh/kg vs. 150-200 Wh/kg of lithium-ion batteries).

Although capable of storing a much higher energy density than a supercapacitor, lithium-ion batteries deliver a very low power density (typically 100-500 W/Kg based on total cell weight), requiring typically hours for re-charge. Conventional lithium-ion batteries also pose some safety concern. The low power density or long re-charge time of a lithium ion battery is due to the mechanism of shuttling lithium ions between an anode active material and a cathode active material. This mechanism requires lithium ions to intercalate into the bulk of anode active material particles during a battery charging procedure, and into the bulk of cathode active material particles during discharging. For instance, in a most commonly used lithium-ion battery featuring graphite particles (typically 5-25 μm in diameter) as an anode active material, lithium ions are required to diffuse into the inter-planar spaces of a graphite crystal at the anode during re-charge. Most of these lithium ions have to come all the way from the cathode side by diffusing out of the bulk of a cathode active particle (e.g. lithium cobalt oxide, lithium iron phosphate, or other lithium insertion compound, typically several μm in size) through the pores of a solid separator (pores being filled with a liquid electrolyte), and into the bulk of a graphite particle at the anode. During discharge, lithium ions diffuse out of the anode active material, migrate through the liquid electrolyte phase, and then diffuse into the bulk of complex cathode crystals.

These intercalation or diffusion processes require a long time to accomplish because solid-state diffusion (diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in less than 10 minutes (e.g. one or two minutes) like a supercapacitor would be considered a revolutionary advancement in the field of energy storage technology.

In addition to lithium-ion cells, there are several other different types of batteries that are widely used in society: alkaline $Zn/MnO_2$, nickel metal hydride (Ni-MH), lead-acid (Pb acid), and nickel-cadmium (Ni—Cd) batteries. Since their invention in 1860, alkaline $Zn/MnO_2$ batteries have become a highly popular primary (non-rechargeable) battery. It is now known that the $Zn/MnO_2$ pair can constitute a rechargeable battery if an acidic salt electrolyte, instead of basic (alkaline) salt electrolyte, is utilized. However, the cycle life of alkaline manganese dioxide rechargeable batteries has been limited to typically 20-30 cycles due to irreversibility associated with $MnO_2$ upon deep discharge and formation of electrochemically inactive phases.

Additionally, formation of a haeterolite ($ZnO:Mn_2O_3$) phase during discharge, when Zn penetrates into the lattice structure of $MnO_2$, has made battery cycling irreversible. The Zn anode also has limitations on cycle life due to the redistribution of Zn active material and formation of dendrites during recharge, causing short-circuits. Attempts to solve some of these issues have been made by Oh, et al. [S. M. Oh, and S. H. Kim, "Aqueous Zinc Sulfate (II) Rechargeable Cell Containing Manganese (II) Salt and Carbon Powder," U.S. Pat. No. 6,187,475, Feb. 13, 2001] and by Kang, et al. [F. Kang, et al. "Rechargeable Zinc Ion Battery", U.S. Pat. No. 8,663,844, Mar. 4, 2014]. However, long-term cycling stability and power density issues remain to be resolved. Due to these reasons, the commercialization of this battery has been limited.

Herein, we present a safe and environmentally benign zinc ion-exchanging battery device that operates on both bulk intercalation and surface storage mechanisms of $Zn^{2+}$ ions. In other words, this dual-mechanism zinc ion-exchanging battery relies on at least two cathode active materials that, in combination, enable both zinc ion intercalation (into bulk of a cathode active material) and zinc ion storage on massive surfaces of a cathode active material (e.g. sheets of a graphene material). This innovative hybrid cathode-based ion-exchanging cell surprisingly overcomes essentially all the problems commonly associated with not only the conventional rechargeable Zn—$MnO_2$ batteries, but also those of lithium-ion batteries (low power density and safety concerns), and those of supercapacities (low energy density).

SUMMARY OF THE INVENTION

The present invention provides a zinc ion-exchanging battery device comprising: (A) a positive electrode or cathode comprising two cathode active materials, an optional binder, and an optional cathode current collector; (B) a negative electrode or anode containing zinc metal or zinc alloy; (C) a porous separator disposed between the cathode and the anode; and (D) a non-aqueous or aqueous electrolyte in physical contact with the cathode and the anode, wherein the electrolyte contains at least a metal ion (e.g. $Zn^{+2}$) that is exchanged between the cathode and the anode during charge and discharge operations of the battery device.

In this battery device, the two cathode active materials consist of (a) at least a zinc ion intercalation compound having inter-planar spaces to reversibly intercalate/deintercalate zinc ions and (b) a surface-mediating material having a surface-borne zinc ion-capturing functional group or zinc ion-storing surfaces in direct contact with the electrolyte to reversibly capture or store zinc ions thereon during the charge and discharge operation of the battery device.

In this device, the zinc ion intercalation compound is selected from chemically treated carbon or graphite material having an expanded inter-graphene spacing $d_{002}$ of at least 0.5 nm, or an oxide, carbide, dichalcogenide, trichalcogenide, sulfide, selenide, or telluride of a transition metal (e.g. niobium, zirconium, molybdenum, hafnium, tantalum, tungsten, titanium, vanadium, chromium, cobalt, manganese, iron, or nickel) or a combination thereof. The inter-graphene spacing $d_{002}$ of a graphitic carbon or graphite is typically 0.3354-0.336 nm, which is too narrow to accommodate $Zn^{+2}$ ions or to make fast diffusion paths for $Zn^{+2}$ ions. We have surprisingly observed that at least 0.5 nm in size would be required for these purposes.

In an embodiment, the zinc ion intercalation compound contains an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

In a particularly desired embodiment, the zinc ion intercalation material includes $MnO_2$ in a nanowire form (not in a particle form) having a wire diameter or thickness less than 100 nm. $MnO_2$ nanowires were found to be more effective than $MnO_2$ particles in providing high power (having better rate capability).

In an embodiment, the zinc ion intercalation compound contains $MnO_2$, which is supported by a surface-mediating material selected from exfoliated graphite, graphene oxide having 2% to 46% by weight of oxygen, chemically functionalized graphene, nitrogen-doped graphene, boron-doped graphene, or fluorinated graphene. Pristine graphene and reduced graphene oxide are not nearly as effective as other graphene materials in promoting the formation of ultra-small $\alpha$-$MnO_2$ particles for faster charge and discharge rates. Hence, pristine graphene and reduced graphene oxide are excluded from the list of $\alpha$-$MnO_2$/graphene combinations, particularly when $\alpha$-$MnO_2$ is not in a nanowire form (typically <100 nm in diameter and 1-200 μm in length).

In an embodiment, the carbide contains a novel 2D MXene material, commonly denoted as $M_{n+1}X_nT_x$, having a surface being terminated by a terminating group selected from 0, OH, and/or F group, wherein M is an early transition metal selected from Ti, Nb, V, or Ta, X is C and/or N, T represents said terminating group, n=1, 2, or 3, and x is the number of terminating groups, and wherein the MXene material is selected from $Ti_2CT_x$, $(Ti_{0.5}, Nb_{0.5})_2CT_x$, $Nb_2CT_x$, $V_2CT_x$, $Ti_3C_2T_x$, $(V_{0.5}, Cr_{0.5})_3C_2T_x$, $Ti_3CNT_x$, $Ta_4C_3T_x$, and $Nb_4C_3T_x$. These materials can be produced by partially etching out certain planes of atoms from layered carbide or carbonide materials.

In this device, the surface-mediating material contains multiple single-layer sheets or multi-layer platelets of a graphene material selected from pristine graphene, graphene oxide (GO) having 2% to 46% by weight of oxygen, reduced graphene oxide (RGO) having 0.01% to 2% by weight of oxygen, chemically functionalized graphene, nitrogen-doped graphene, boron-doped graphene, fluorinated graphene, or a combination thereof and these sheets or platelets form a network of interconnected electron-conducting paths and the zinc ion intercalation compound is physically connected or chemically bonded to these graphene sheets or platelets.

Quite significantly, the presence of certain graphene sheets (e.g. heavily oxidized graphene oxide, chemically functionalized graphene, nitrogen-doped graphene, and boron-doped graphene) is very effective in regulating (reducing) the size of the $Zn^{+2}$ ion intercalation compound during its formation process, helping to produce compounds that are ultra-small (e.g. <50 nm in length/width) and ultra-thin (e.g. <10 nm in thickness). These ultra-small sizes are highly conducive to fast diffusion of $Zn^{+2}$ ions, enabling high charge or discharge rates and high power densities. These features are not commonly found in any type of battery. The pristine graphene and reduced graphene oxide (RGO) are not as effective as other types of graphene materials or exfoliated graphite in reducing the particle or domain size of $MnO_2$ during the formation process of $MnO_2$. Thus, pristine graphene/$MnO_2$ and RGO/$MnO_2$ combinations are not preferred pairs of surface-mediating material and zinc ion intercalation compound.

In an embodiment, the electrolyte comprises at least a transition metal ion salt dissolved in water or an organic solvent, preferably Zn salt and a salt of Fe, Ti, Mn, Co, Ni, or V. The electrolyte may comprise a zinc metal salt-doped ionic liquid. Preferably, the electrolyte contains at least two different types of metal ions that participate in storing and releasing electrons The electrolyte may be an aqueous electrolyte or an organic electrolyte. The electrolyte can comprise at least a metal ion salt selected from a transition metal sulphate, transition metal phosphate, transition metal nitrate, transition metal acetate, transition metal carboxylate, transition metal chloride, transition metal bromide, transition metal perchlorate, transition metal hexafluorophosphate, transition metal borofluoride, transition metal hexafluoroarsenide, or a combination thereof.

When water is used, the electrolyte preferably comprises at least a metal ion salt selected from zinc sulphate, zinc phosphate, zinc nitrate, zinc acetate, zinc carboxylate, zinc chloride, zinc bromide, zinc perchlorate, manganese sulphate, manganese phosphate, manganese nitrate, manganese acetate, manganese carboxylate, manganese chloride, manganese bromide, manganese perchlorate, cobalt sulphate, cobalt phosphate, cobalt nitrate, cobalt acetate, cobalt carboxylate, cobalt chloride, cobalt bromide, cobalt perchlorate, nickel sulphate, nickel phosphate, nickel nitrate, nickel acetate, nickel carboxylate, nickel chloride, nickel bromide, nickel perchlorate, iron sulphate, iron phosphate, iron nitrate, iron acetate, iron carboxylate, iron chloride, iron bromide, iron perchlorate, vanadium sulphate, vanadium phosphate, vanadium nitrate, vanadium acetate, vanadium carboxylate, vanadium chloride, vanadium bromide, vanadium perchlorate, or a combination thereof. For instance, one may choose to use a mixture of zinc sulphate and cobalt sulfate if the $Zn^{+2}$ ion intercalation compound is a cobalt oxide-based material.

The organic electrolyte can comprise an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA), or a combination thereof.

In a preferred embodiment, the surface-mediating material has a functional group that reversibly reacts with a zinc ion, forms a redox pair with a zinc ion, or forms a chemical complex with a zinc ion.

In a preferred embodiment, multiple sheets or platelets of the graphene material, prior to being made into a cathode, have a specific surface area no less than 100 $m^2/g$ (more preferably >200 $m^2/g$, further preferably >500 $m^2/g$) to store or support zinc ions or atoms thereon and the resulting cathode also has a specific surface area no less than 100 $m^2/g$ and meso-pores having a size from 2 to 50 nm. Preferably, the cathode has a specific surface area no less than 200 $m^2/g$ (preferably >500 $m^2/g$) and meso-pores having a size from 2 to 50 nm.

In the anode of the battery device, the zinc metal or zinc alloy can be a zinc metal or alloy chip, foil, powder, filament, surface stabilized particle, or a combination thereof. Actually, there is no limitation on the shape of this zinc metal or alloy. The zinc alloy preferably has at least 70% by eight of the element Zn, preferably at least 80%, and most preferably at least 90%.

In an embodiment, the surface-mediating material occupies a weight fraction between 0.1% and 5% based on the combined weights of the surface-mediating material and the zinc ion intercalation compound. In another embodiment, the weight fraction is from 0.1% to 50%. In a preferred embodiment, the surface-mediating material occupies a weight fraction between 50% and 99%. Broadly speaking, the surface-mediating material can occupy a weight fraction between 0.1% and 99%.

The functional material can have a functional group selected from —COOH, =O, —NH$_2$, —OR, or —COOR, where R is a hydrocarbon radical. These functional groups are capable of reversibly capturing zinc ions.

The invented battery device typically provides an energy density of no less than 200 Wh/kg or power density no lower than 5 Kw/kg, all based on total battery device weight. More typically, the device provides an energy density of no less than 500 Wh/kg or power density no lower than 10 Kw/kg, all based on total battery device weight. In many cases, the device provides an energy density of no less than 800 Wh/kg or power density no less than 15 Kw/kg, all based on total battery device weight. In some cases, the device provides an energy density of no less than 1,000 Wh/kg or power density no less than 20 Kw/kg, all based on total battery device weight.

In a preferred embodiment, the anode of the battery device further contains a porous anode current collector selected from a porous sheet, paper, web, film, fabric, non-woven, mat, aggregate, or foam of a carbon or graphite material selected from graphene, graphene oxide, reduced graphene oxide, graphene fluoride, doped graphene, functionalized graphene, expanded graphite, exfoliated graphite or graphite worms, chemically etched or expanded soft carbon, chemically etched or expanded hard carbon, exfoliated activated carbon, chemically etched or expanded carbon black, chemically etched multi-walled carbon nanotube, nitrogen-doped carbon nanotube with an enhanced metal ion capturing ability, boron-doped carbon nanotube with an enhanced metal ion capturing ability, chemically doped carbon nanotube with an enhanced metal ion capturing ability, ion-implanted carbon nanotube with an enhanced metal ion capturing ability, chemically treated multi-walled carbon nanotube, chemically expanded carbon nano-fiber, chemically activated carbon nano-tube, chemically treated carbon fiber, chemically activated graphite fiber, chemically activated carbonized polymer fiber, chemically treated coke, meso-phase carbon, or a combination thereof. Preferably, the zinc metal or zinc alloy is preloaded or pre-coated on this porous anode current collector.

In an embodiment, the anode further contains an alternative nano-structured anode current collector which is a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerogel, graphene foam, graphene oxide foam, reduced graphene oxide foam, or a combination thereof. Preferably, the zinc metal or zinc alloy is preloaded or pre-coated on said anode current collector.

These anode current collectors preferably have massive surfaces having a specific surface area greater than 50 m$^2$/g, preferably greater than 100 m$^2$/g, more preferably greater than 300 m$^2$/g, further preferably greater than 500 m$^2$/g, and most preferably greater than 1,000 m$^2$/g. These massive surfaces enable fast release of zinc ions during the battery discharge and fast deposition of zinc ions during battery charge.

The present invention also provides a zinc ion-exchanging battery device comprising no surface-mediating material (e.g. no graphene sheets) in the cathode. This battery device comprises: (A) a positive electrode or cathode comprising a zinc ion intercalation compound as a cathode active material, an optional binder, and an optional cathode current collector; (B) a negative electrode or anode containing zinc metal or zinc alloy (optionally supported by a nano-structured current collector); (C) a porous separator disposed between the cathode and the anode; and (D) a non-aqueous or aqueous electrolyte in physical contact with the cathode and the anode, wherein the electrolyte contains zinc ions that are exchanged between the cathode and the anode during a charge and discharge operation of the battery device. The zinc ion intercalation compound has inter-planar spaces sufficiently large to reversibly intercalate/deintercalate zinc ions and is selected from chemically treated carbon or graphite material having an expanded inter-graphene spacing d$_{002}$ of at least 0.5 nm, zinc hydroxide salt, or an oxide, carbide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof; wherein manganese oxide is in a nanowire form.

In such a battery, the zinc ion intercalation compound can contain an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. The carbide can contain a 2D MXene material.

The electrolyte can comprise a zinc metal salt-doped ionic liquid, aqueous electrolyte, or organic electrolyte. In an embodiment, the electrolyte comprises at least a metal ion salt selected from a transition metal sulphate, transition metal phosphate, transition metal nitrate, transition metal acetate, transition metal carboxylate, transition metal chloride, transition metal bromide, transition metal perchlorate, transition metal hexafluorophosphate, transition metal borofluoride, transition metal hexafluoroarsenide, or a combination thereof. In a preferred embodiment, the electrolyte comprises at least a metal ion salt selected from zinc sulphate, zinc phosphate, zinc nitrate, zinc acetate, zinc carboxylate, zinc chloride, zinc bromide, zinc perchlorate, or a combination thereof.

Actually, the same electrolytes used in the corresponding cells having a surface-mediating material as well as a zinc ion intercalation compound at the cathode can be used in this group of batteries having no surface-mediating material (only the intercalation compound) at the cathode.

DESCRIPTION OF THE PREFERRED EMBODIMENTS

Figure 1:
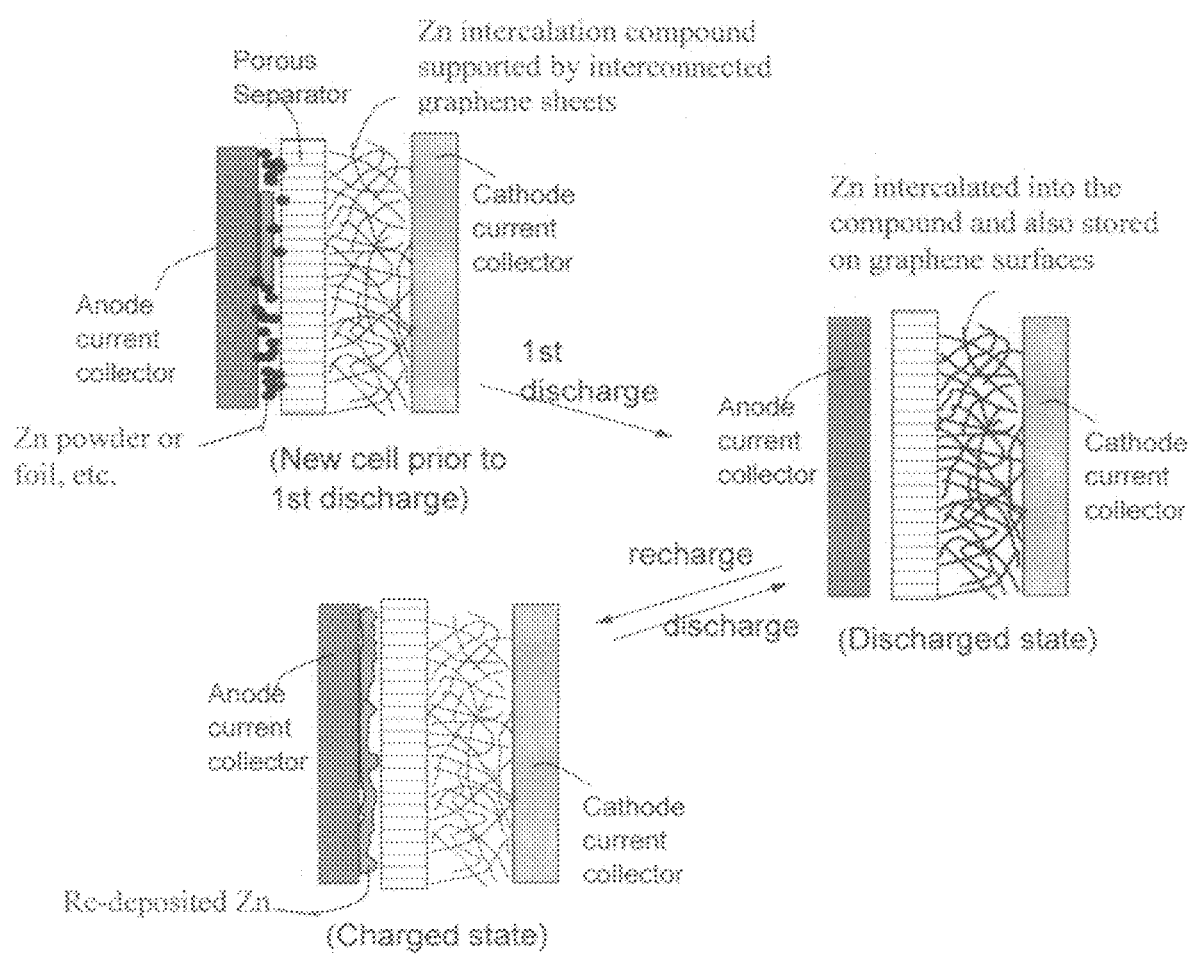
FIG. 1 The structure of a zinc ion-exchanging battery device when it is made (prior to the first discharge or charge cycle).

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an electrochemical energy storage device that is herein referred to as a zinc ion-exchanging battery. This device exhibits a power density significantly higher than the power densities of conventional supercapacitors and dramatically higher than those of conventional lithium ion batteries. This device also exhibits an energy density significantly higher than those of conventional lithium and alkaline manganese rechargeable batteries.

This zinc ion-exchanging battery device comprises four major components:

(A) a positive electrode or cathode comprising two cathode active materials, an optional binder, and an optional cathode current collector (due to the high conductivity of the graphene sheets used, the graphene sheets can be made into an integral layer structure that also acts as a current collector and, hence, a separate current collector is not required);

(B) a negative electrode or anode containing zinc metal or zinc alloy that can be in a foil, disc, filament, particle shape, or any shape;

(C) a porous separator disposed between the cathode and the anode; and (D) a non-aqueous or aqueous electrolyte in physical contact with the cathode and the anode, wherein the electrolyte contains at least a metal ion (e.g. $Zn^{+2}$) that is exchanged between the cathode and the anode during a charge and discharge operation of the battery device.

The two cathode active materials consist of (a) at least a zinc ion intercalation compound having sufficient inter-planar spaces to reversibly intercalate/deintercalate zinc ions therein and (b) a surface-mediating material having a surface-borne zinc ion-capturing functional group or zinc ion-storing surfaces in direct contact with the electrolyte to reversibly capture or store zinc ions thereon during the charge and discharge operation of the battery device.

The zinc ion intercalation compound may be selected from chemically treated carbon or graphite materials having an expanded inter-graphene spacing $d_{002}$ of at least 0.5 nm. The inter-graphene spacing $d_{002}$ of a graphitic carbon or graphite is typically 0.3354-0.336 nm, which is too narrow to accommodate $Zn^{+2}$ ions or to make fast diffusion paths for $Zn^{+2}$ ions. We have surprisingly observed that at least 0.5 nm in size would be required for these purposes, preferably >0.7 nm.

Alternatively, the zinc ion intercalation compound may be selected from zinc hydroxide salt, or an oxide, dichalcogenide, trichalcogenide, sulfide, selenide, or telluride of a transition metal. This transition metal is preferably selected from niobium, zirconium, molybdenum, hafnium, tantalum, tungsten, titanium, cobalt, manganese, iron, nickel, or a combination thereof. There are two most preferred groups in this category: (1) oxides of vanadium, chromium, cobalt, manganese, iron, nickel, or combinations thereof, and (2) dichalcogenides, sulfides, selenides, and tellurides of niobium, zirconium, molybdenum, hafnium, tantalum, tungsten, or titanium. The latter group of materials (e.g. zirconium disulfide, molybdenum selenide) can be readily formed into layered structures with a first inter-planar spacing. This space between two layers can be expanded (e.g. via chemical intercalation) and chemically treated to make the space wider and more conducive to fast diffusion of $Zn^{+2}$ ions and to a significantly higher $Zn^{+2}$ ion storage capacity. The former group of materials (e.g. α-$MnO_2$ and Zn-doped $Na_{0.8}CoO_2$) has interstitial spaces in their crystal lattice to accept $Zn^{+2}$ ions. Zinc ions can also intercalate into the structure resulting from Na extraction from $Na_{0.7}CoO_2$ by $H_2SO_4$. Zinc ion intercalation compounds can also be made by chemical treatments (e.g. extraction of Li or Na by $H_2SO_4$) of $LiMn_2O_4$, $Li_{(1-z)}Ni_{(1+z)}O_2$, etc.

A useful class of ion intercalation compounds is a novel family of 2D metal carbides or metal carbonides, now commonly referred to as MXenes. These materials were produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $(Ti_{0.5}, Nb_{0.5})_2CT_x$, $Nb_2CT_x$, $V_2CT_x$, $Ti_3C_2T_x$, $(V_{0.5}, Cr_{0.5})_3C_2T_x$, $Ti_3CNT_x$, $Ta_4C_3T_x$, and $Nb_4C_3T_x$.

In this invented battery device, the surface-mediating material contains multiple single-layer sheets or multi-layer platelets of a graphene material selected from pristine graphene, graphene oxide, reduced graphene oxide, chemically functionalized graphene, nitrogen-doped graphene, boron-doped graphene, fluorinated graphene, or a combination thereof and these sheets or platelets form a network of interconnected electron-conducting paths and the zinc ion intercalation compound is physically connected or chemically bonded to these graphene sheets or platelets. Quite significantly, the presence of certain graphene sheets (e.g. heavily oxidized graphene oxide, chemically functionalized graphene, nitrogen-doped graphene, and boron-doped graphene) is very effective in regulating (reducing) the size of the $Zn^{+2}$ ion intercalation compound during its formation process, helping to produce compounds that are ultra-small (e.g. <50 nm in length/width) and ultra-thin (e.g. <10 nm in thickness). These ultra-small sizes are highly conducive to fast diffusion of $Zn^{+2}$ ions, enabling high charge or discharge rates and high power densities. These features are not commonly found in any type of battery.

In an embodiment, the electrolyte comprises at least a transition metal ion salt dissolved in water or an organic solvent, preferably Zn salt and a salt of Fe, Ti, Mn, Co, Ni, or V. The electrolyte may comprise a zinc metal salt-doped ionic liquid. Preferably, the electrolyte contains at least two different types of metal ions that participate in storing and releasing electrons The electrolyte may be an aqueous electrolyte or an organic electrolyte. The electrolyte can comprise at least a metal ion salt selected from a transition metal sulphate, transition metal phosphate, transition metal nitrate, transition metal acetate, transition metal carboxylate, transition metal chloride, transition metal bromide, transition metal perchlorate, transition metal hexafluorophosphate, transition metal borofluoride, transition metal hexafluoroarsenide, or a combination thereof.

When water is used, the electrolyte preferably comprises at least a metal ion salt selected from zinc sulphate, zinc phosphate, zinc nitrate, zinc acetate, zinc carboxylate, zinc chloride, zinc bromide, zinc perchlorate, manganese sulphate, manganese phosphate, manganese nitrate, manganese acetate, manganese carboxylate, manganese chloride, manganese bromide, manganese perchlorate, cobalt sulphate, cobalt phosphate, cobalt nitrate, cobalt acetate, cobalt carboxylate, cobalt chloride, cobalt bromide, cobalt perchlorate, nickel sulphate, nickel phosphate, nickel nitrate, nickel acetate, nickel carboxylate, nickel chloride, nickel bromide, nickel perchlorate, iron sulphate, iron phosphate, iron nitrate, iron acetate, iron carboxylate, iron chloride, iron bromide, iron perchlorate, or a combination thereof. For instance, one may choose to use a mixture of zinc sulphate and cobalt sulfate if the $Zn^{+2}$ ion intercalation compound is a cobalt oxide-based material.

The organic electrolyte can comprise an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA), or a combination thereof.

In a preferred embodiment, the surface-mediating material has a functional group that reversibly reacts with a zinc ion, forms a redox pair with a zinc ion, or forms a chemical complex with a zinc ion.

Examples of Surface-Mediating Materials

Figure 4:
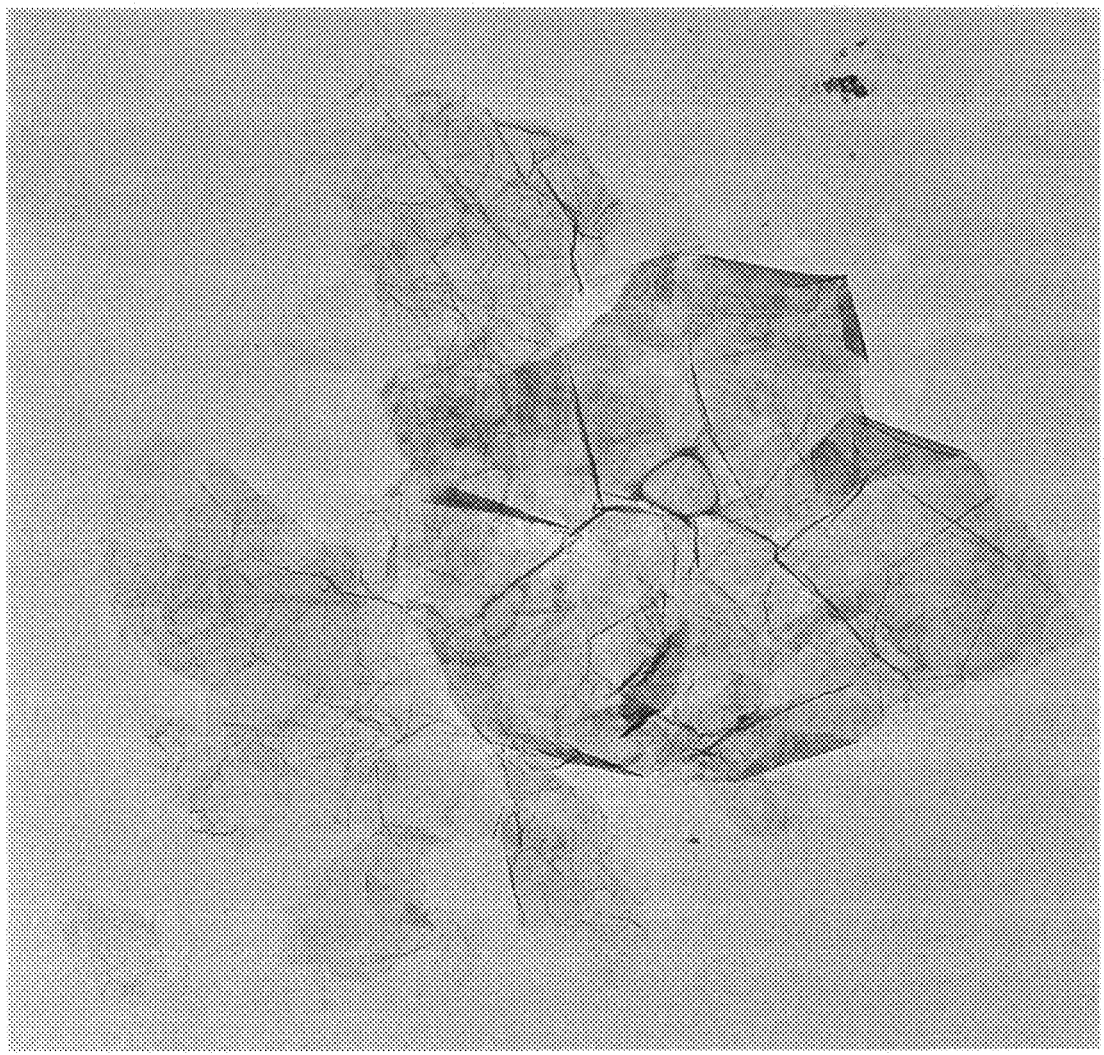
FIG. 4 TEM image of single-layer graphene sheets that are partially re-stacked together.
Figure 5:
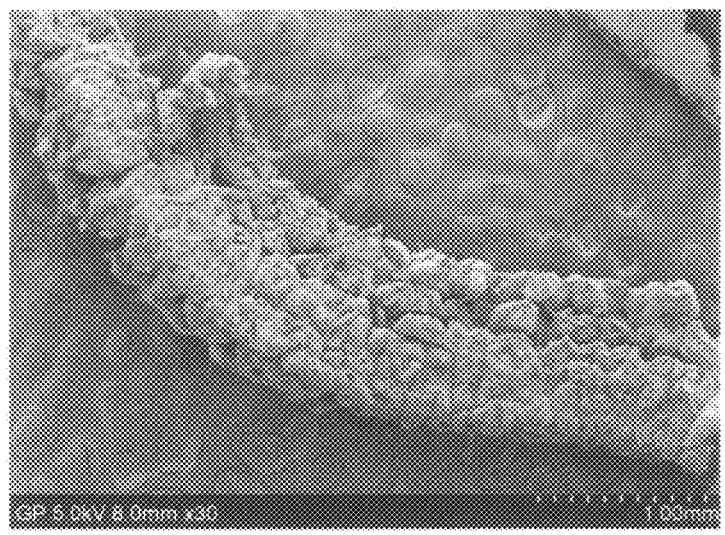
FIG. 5 SEM image of curved or wrinkled graphene sheets.

Surface-mediating materials investigated in the present study include various graphene materials (also referred to as nano graphene platelet or NGP; FIG. 4 and FIG. 5) and exfoliated graphite (graphite worms, FIG. 6, recompressed or separated into expanded graphite flakes having a thickness >100 nm). These materials can be used as a supporting substrate for zinc ion intercalation compounds which are normally not electrically conducting. What follows is a description of NGP and exfoliated graphite:

Nano Graphene Platelet (NGP) and Exfoliated Graphite (Graphite Worms)

An NGP is a single-layer graphene sheet or a stack of several graphene sheets with each sheet being a hexagonal structure of carbon atoms (single layer being as thin as 0.34 nm or one atom thick). The applicant's research group was the first in the world to discover single-layer graphene [B. Z. Jang and W. C. Huang, "Nano-scaled Graphene Plates," U.S. patent application Ser. No. 10/274,473 (Oct. 21, 2002); now U.S. Pat. No. 7,071,258 (Jul. 4, 2006)] and the first to use graphene for supercapacitor [L. Song, A. Zhamu, J. Guo, and B. Z. Jang "Nano-scaled Graphene Plate Nanocomposites for Supercapacitor Electrodes" U.S. patent application Ser. No. 11/499,861 (Aug. 7, 2006), now U.S. Pat. No. 7,623,340 (Nov. 24, 2009)], and for lithium-ion battery applications [A. Zhamu and B. Z. Jang, "Nano Graphene Platelet-Based Composite Anode Compositions for Lithium Ion Batteries," U.S. patent application Ser. No. 11/982,672 (Nov. 5, 2007), now U.S. Pat. No. 7,745,047 (Jun. 29, 2010)].

For the purpose of defining the geometry of an NGP (including non-oxidized graphene and graphene oxide), the NGP is described as having a length (the largest dimension), a width (the second largest dimension), and a thickness. The thickness is the smallest dimension, which is no greater than 100 nm and, in the present application, no greater than 10 nm (preferably no greater than 5 nm and most preferably single-layer graphene, including single-layer graphene oxide, with a thickness of approximately 0.34-1.2 nm). When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (with up to approximately 45% by weight oxygen). Graphene oxide can be thermally or chemically reduced to become reduced graphene oxide (typically with an oxygen content of 1-20%). For use in the cathode of the instant battery device, the oxygen content is preferably in the range of 5% to 30% by weight, and more preferably in the range of 10% to 30% by weight. NGPs collectively include pristine graphene (essentially 0% oxygen), reduced graphene oxide (RGO, 0.01%-5% by weight of 0), graphene oxide (5%-46% by weight of 0), nitrogenated graphene, halogenated graphene (e.g. fluorinated graphene), doped graphene, and chemically functionalized graphene.

In a preferred embodiment, the graphene electrode material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The electrode material may be selected from an exfoliated graphite material. The starting graphitic material for producing any one of the above graphene or exfoliated graphite materials may be selected from natural graphite, artificial graphite, mesophase carbon, meso-phase pitch, meso-carbon micro-bead, soft carbon, hard carbon, coke, carbon fiber, carbon nano-fiber, carbon nano-tube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Figure 2:
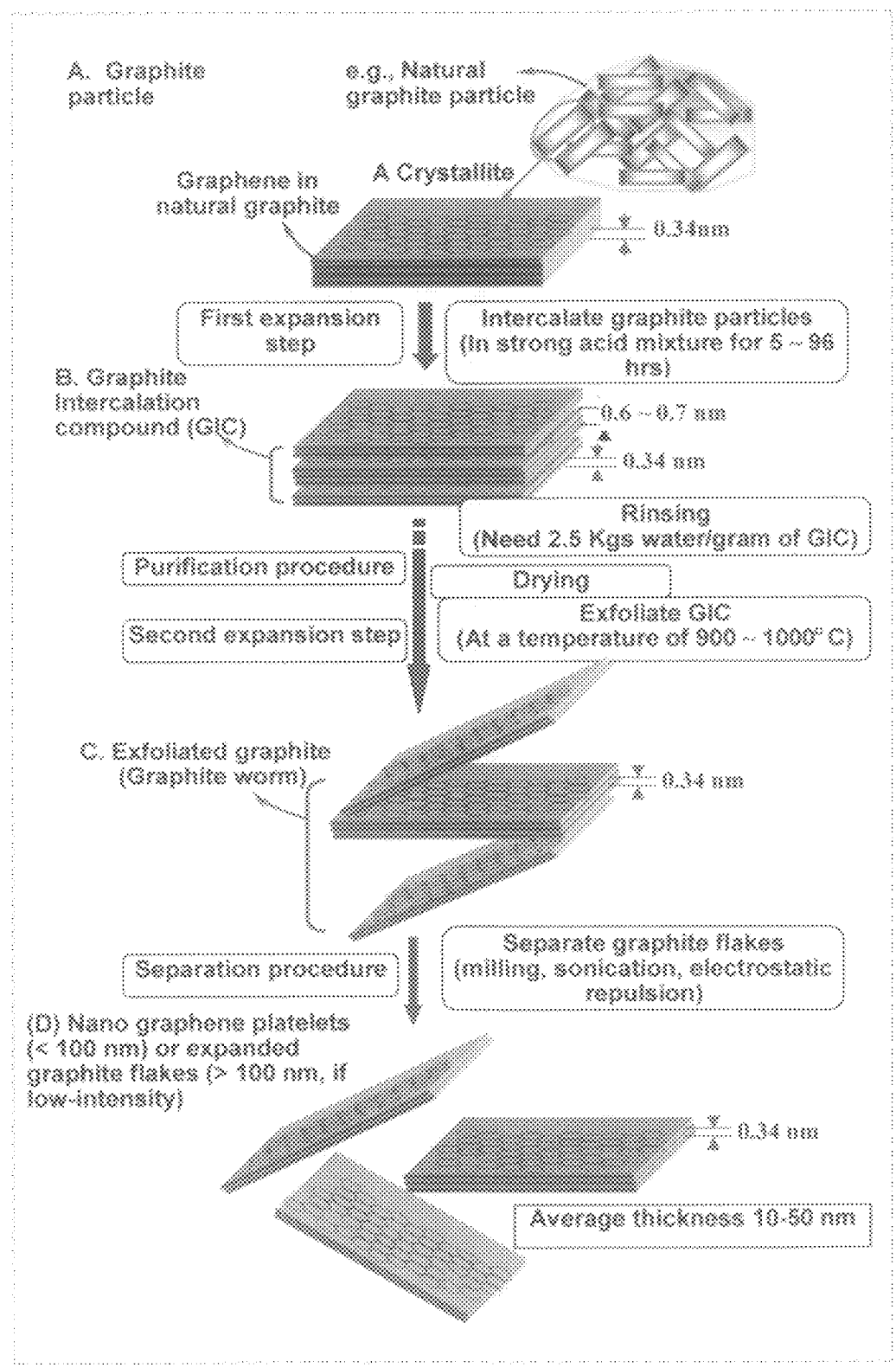
FIG. 2 Schematic of the commonly used procedures for producing exfoliated graphite worms and graphene sheets.
Figure 3:
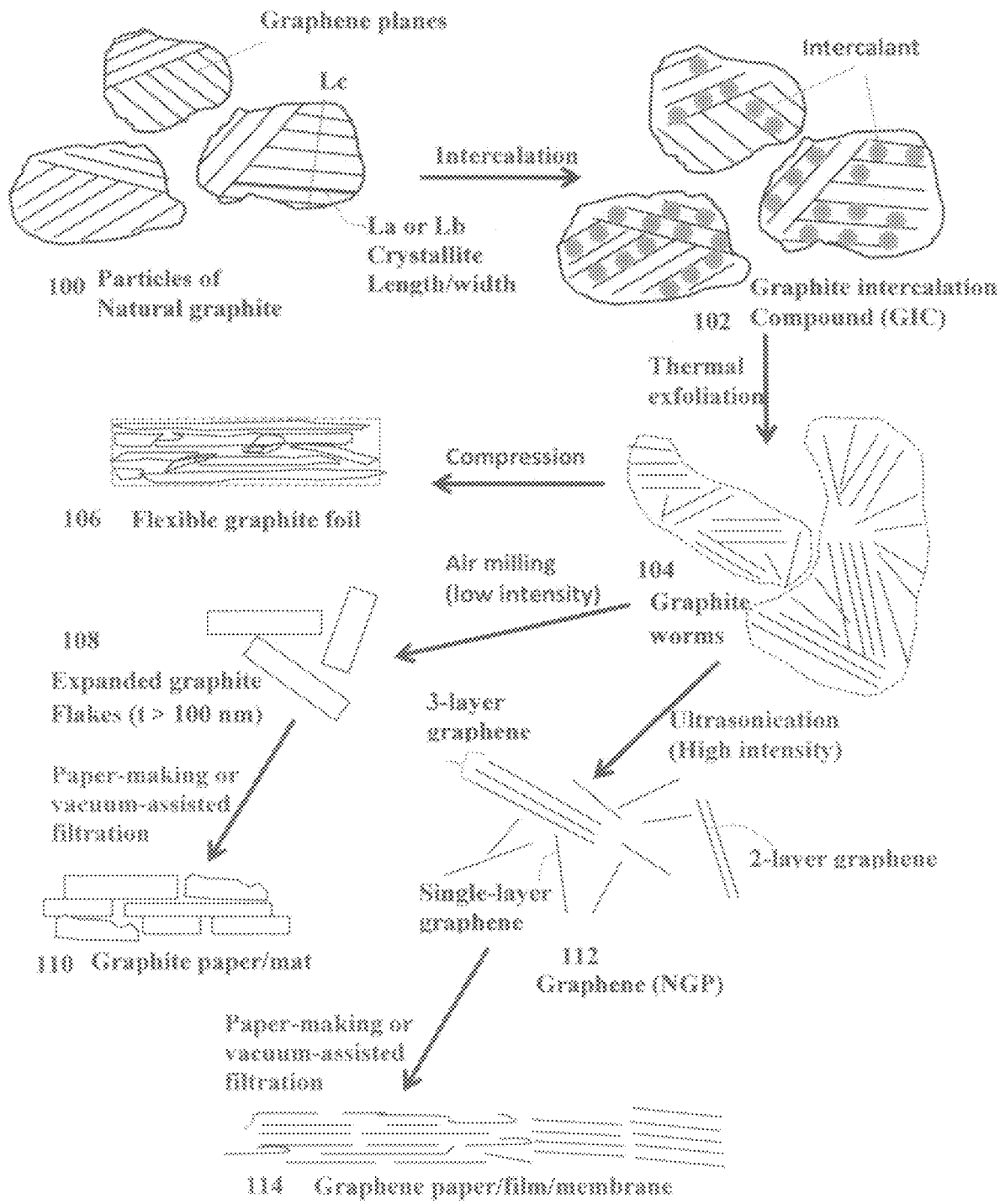
FIG. 3 Another schematic drawing to illustrate the process for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 2 and FIG. 3 (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 3) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Figure 6:
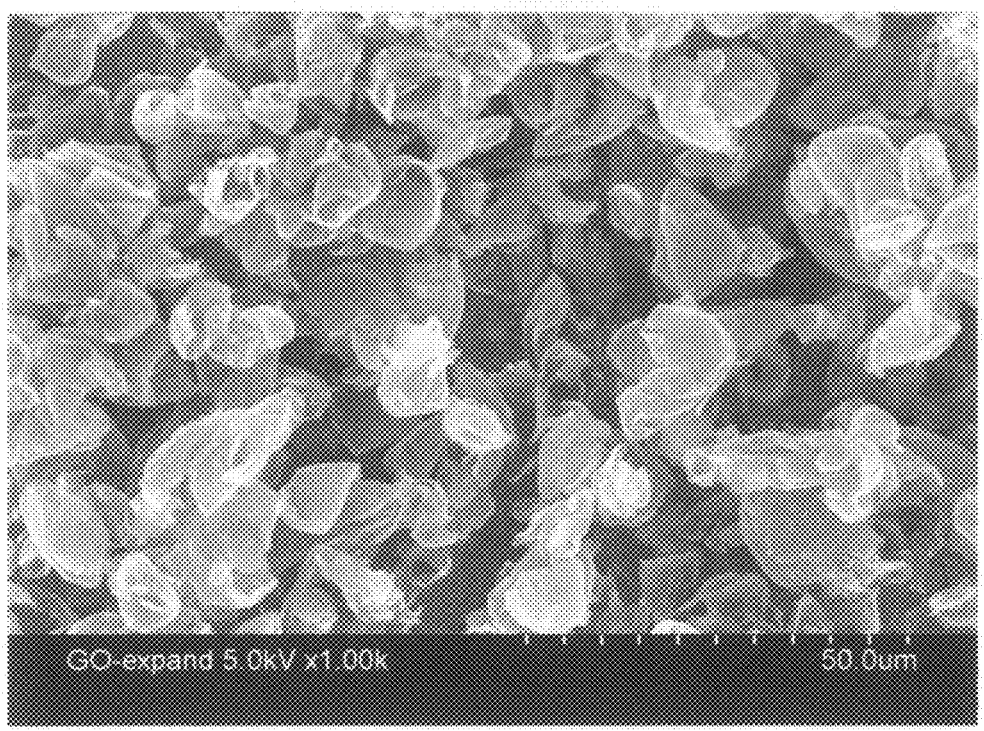
FIG. 6 SEM images of exfoliated graphite worms imaged at a low magnification.
Figure 7:
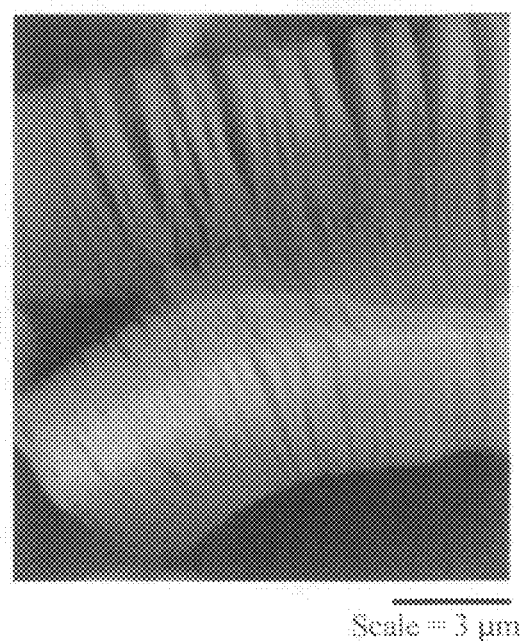
FIG. 7 SEM image of a layered 2D material ($Ti_3C_2T_x$).
Figure 8:
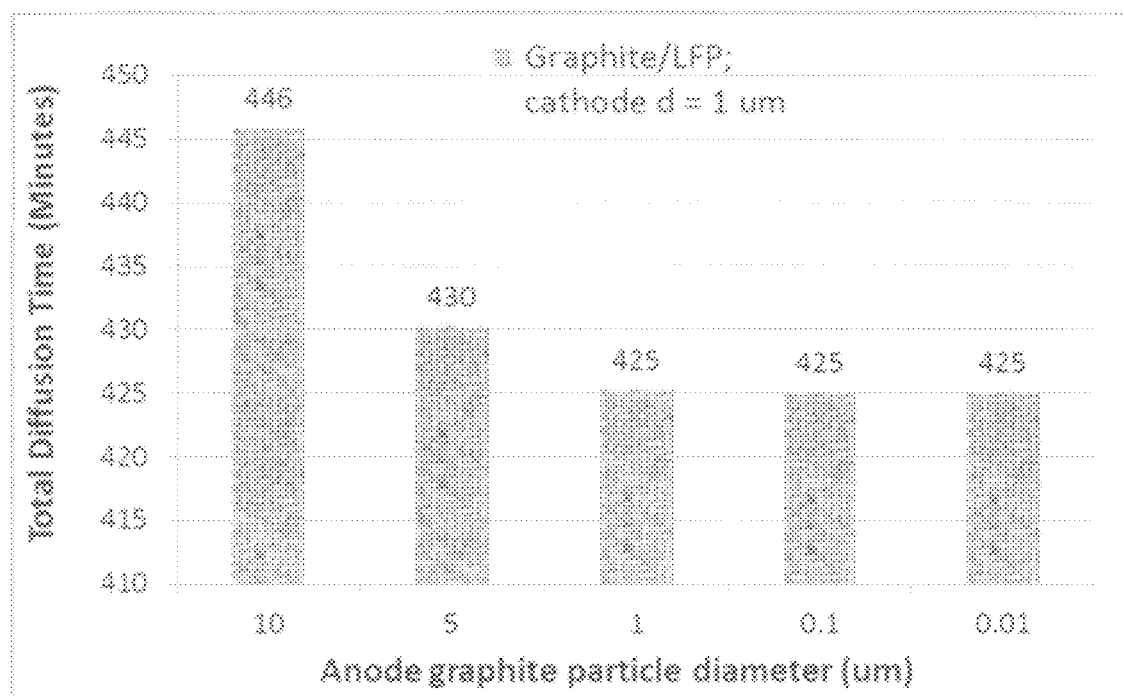
FIG. 8 Estimated total diffusion times to complete a charging or discharging cycle, plotted as a function of the graphite particle size for a lithium-ion battery with a lithium iron phosphate cathode active material (particle size=1 μm).

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. FIG. 6 shows a new breed of graphene that is herein referred to as the curved graphene platelet or sheet. Curved NGPs are capable of forming a meso-porous structure having a desired pore size range (e.g. slightly >2 nm) when they were stacked together to form an electrode. This size range allows the commonly used metal ion-containing electrolytes to enter the pores between graphene sheets and edges so that the metal ions (zinc ions, etc) can simply swim through liquid electrolyte to reach and rapidly react/interact with surface-borne functional groups. These surface-borne functional groups are on a graphene plane surface or an edge surface, which is in direct contact with liquid electrolyte. The metal ions are not required to undergo solid-state diffusion (intercalation) in order to be stored in a nano-structured or porous NGP electrode (or released from this electrode) and, hence, such an electrode is said to be surface-mediated or surface enabled.

The curved NGPs may be produced by using the following recommended procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);
(c) dispersing the exfoliated graphite to a liquid medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up graphite worms to form separated/isolated NGPs and/or to help attach desired functional groups to the oxidized NGPs, resulting in the formation of functionalized NGPs. The functionalizing agent may be an amine- or —$NH_2$-containing group, as used in several common curing agents for epoxy resins; and, optionally,
(d) aerosolizing the graphene-liquid solution into liquid droplets containing chemically functionalized single or multiple NGPs while concurrently removing the liquid to recover curved NGPs containing desired functional groups. Without the aerosolizing step, the resulting functionalized graphene platelets tend to be flat-shaped.

It may be noted that steps (a) to (b) are the most commonly used steps to obtain exfoliated graphite and graphene oxide platelets in the field. Step (c) is designed for imparting additional functional groups to NGPs. Step (d) is essential to the production of curved graphene sheets. Oxidized NGPs or GO platelets may be chemically reduced to recover conductivity properties using hydrazine as a reducing agent, before, during, or after chemical functionalization.

The carboxylic acids, being environmentally benign, are particularly preferred functionalizing agents for imparting carbonyl or carboxylic groups to NGPs. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anhydrides thereof, reactive carboxylic acid derivatives thereof, and combinations thereof. The most preferred carboxylic acids are formic acid and acetic acid.

The NGPs used in the aforementioned electrode may be subjected to the following treatments, separately or in combination, before or after the functionalization operation:
(i) chemically functionalized with a different functional group. Other useful surface functional groups may include quinone, hydroquinone, quaternized aromatic amines, or mercaptans;
(ii) coated or grafted with a polymer that contains a desired functional group (e.g., carbonyl group);
(iii) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

The above-described processes produce graphene oxide platelets or oxidized NGPs. The heavy oxidation step involved in these processes intrinsically introduces oxygen-containing groups to both the edge surfaces and the basal plane surfaces (top and bottom surfaces) of an NGP. This can be good or bad. On the one hand, we would like to create as many functional groups as possible to maximize the lithium-capturing capacity. But, on the other hand, the functional groups on the basal or graphene plane necessarily inflict damage to the plane and significantly reduce the over-all conductivity of an NGP. The formation of functional groups in this manner, without step (c) above, is not a well-controlled process.

Fortunately, after very diligent research work, we have discovered an alternative way to impart functional groups to NGPs in a more controlled manner. This new way involves producing pristine NGPs without going through the conventional chemical intercalation/oxidation procedure. The produced non-oxidized graphene (naturally having edge surfaces being more chemically active) is then subjected to controlled oxidation or controlled functionalization. We have surprisingly found that functional groups were attached to the edge surfaces first and essentially exhausted the active sites at the edge surfaces before any significant amount of functional groups began to attach themselves to the basal planes.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production." Once pristine graphene is produced, the material is then exposed to an oxidation or functionalization treatment using, for example, a gaseous-phase or liquid acid or acid mixture. The pristine NGPs may also be immersed in carboxylic acids at a desired temperature for a period of time to obtain NGPs with a desired level of functionalization.

Specifically, the oxidation treatment comprises subjecting the pristine NGP material to an oxidizing agent preferably selected from ozone, sulfonic ($SO_3$) vapor, an oxygen-containing gas, hydrogen peroxide vapor, nitric acid vapor, or a combination thereof. Preferably, the treatment comprises subjecting the pristine NGP material to an oxidizing agent in a hydrogen-containing environment. Although oxidation treatment can be conducted by immersing NGPs in a liquid acid and/or oxidizer environment, such a procedure requires a subsequent water-rinsing and purification step (such a rinsing procedure is not as tedious as required in the case of conventional sulfuric acid-intercalation graphite, nevertheless). Hence, a gaseous treatment requiring no post-treatment rinsing is preferred.

A primary goal of the oxidation treatment is to impart a desired amount of functional groups to pristine NGPs without a significant compromise in electrical conductivity. After an extensive and in-depth study we have come to discover that conductive functionalized NGPs can be produced with an oxygen content no greater than 25% by weight, preferably between 5% and 25% by weight. Presumably, a majority of the functional groups are located at the edge surfaces of NGPs since the electrical conductivity would not be significantly reduced. Beyond 25% of over-all oxygen content, functional groups begin to appear on graphene plane surfaces, interrupting electron-conducting paths. The oxygen contents were determined using chemical elemental analysis and X-ray photoelectron spectroscopy (XPS).

The partially oxidized NGPs prepared according to a preferred embodiment of the present invention can be further functionalized by carrying out an additional step of contacting the partially oxidized NGPs with a reactant so that a functional group is added to a surface or edge of the nano graphene platelet. The functional group may contain alkyl or aryl silane, alkyl or aralkyl group, hydroxyl group, amine group, fluorocarbon, or a combination thereof.

The NGPs, after a partial oxidation treatment, will have a reactive graphene surface (RGS) or reactive graphene edge (RGE). They can be prescribed to undergo the following reactions:

(a) RGS/RGE+$CH_2$=CHCOX (at 1,000° C.)→Graphene-R'COH (where X=—OH, —Cl, or —$NH_2$); e.g., RGS/RGE+$CH_2$=CHCOOH→G-R'CO—OH (where G=graphene);
(b) RGS/RGE+Maleic anhydride→G-R'$(COOH)_2$;
(c) RGS/RGE+$CH_2$=CH—$CH_2$X→G-R'$CH_2$X (where X=—OH, -halogen, or —$NH_2$);
(d) RGS/RGE+$H_2O$→G=O (Quinoidal);
(e) RGS/RGE+$CH_2$=CHCHO→G-R'CHO (Aldehydic);

In the above-listed reactions, R' is a hydrocarbon radical (alkyl, cycloalkyl, etc). Partial oxidation of pristine NGPs can lead to the attachment of some functional groups on a surface or at an edge of a graphene plane, including carboxylic acid and hydroxyl groups. A large number of derivatives can be prepared from carboxylic acid alone. For instance, alcohols or amines can be easily linked to acid to provide stable esters or amides.

Any reaction capable of attaching carbonyl (>C=O) or amine (—$NH_2$) group to the graphene edge or basal plane surface may be used for practicing the instant invention.

We have also surprisingly observed that the surface of a graphene sheet, basically made up of a layer of carbon atoms arranged in a hexagonal or honeycomb-like structure, can also allow metal ions to adsorb thereon in a fast and reversible manner. Such a mono-layer of metal atoms (e.g. Zn atoms) appears to be sufficiently stable so that zinc metal atom-adsorbed graphene surfaces, if used as an anode active material, would not lead to any significant self-discharge. When used at the cathode, the metal atoms adsorbed thereon can be readily released during the battery re-charging cycle, enabling a fast re-charging.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ (2≤x≤24) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 3, a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the α-axis (or b-axis) direction. The c-axis is the direction perpendicular to the basal planes. The α- or b-axes are the directions parallel to the basal planes (perpendicular to the c-axis direction).

A highly ordered graphite particle can consist of crystallites of a considerable size, having a length of $L_a$ along the crystallographic α-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 3, different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 3) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications. An example of exfoliated graphite worm (or, simply, graphite worms) is presented in FIG. 5.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Several techniques can be employed to fabricate a conductive layer of porous graphene structure (a web, mat, paper, or porous film, etc.), which is a monolithic body having a 3-D network of interconnected electron-conducting paths and desired more or less interconnected pores that are accessible to liquid electrolyte.

In one prior art process, the exfoliated graphite (or mass of graphite worms) is heavily re-compressed by using a calendaring or roll-pressing technique to obtain flexible graphite foils (106 in FIG. 3), which are typically 100-500 μm thick. This conventional flexible graphite foil does not have a specific surface area >100 m$^2$/g. Even though the flexible graphite foil is porous, most of these pores are not accessible to liquid electrolyte when immersed in an external electrochemical deposition chamber or incorporated in a lithium battery. For the preparation of a desired layer of porous graphene structure, the compressive stress and/or the gap between rollers can be readily adjusted to obtain a desired layer of porous graphene structure that has massive graphene surfaces (having a specific surface area >100 m$^2$/g) accessible to liquid electrolyte and available for receiving the sulfur coating or nano particles deposited thereon.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 3). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 3) using a film- or paper-making process.

Alternatively, with a low-intensity shearing, graphite worms tend to be separated into the so-called expanded graphite flakes (108 in FIG. 3) having a thickness >100 nm. These flakes can be formed into graphite paper or mat 106 using a paper- or mat-making process, with or without a resin binder. In one preferred embodiment of the present invention, the porous web can be made by using a slurry molding or a flake/binder spraying technique. These methods can be carried out in the following ways:

As a wet process, aqueous slurry is prepared which comprises a mixture of graphene sheets or expanded graphite flakes and, optionally, about 0.1 wt. % to about 10 wt. % resin powder binder (e.g., phenolic resin). The slurry is then directed to impinge upon a sieve or screen, allowing water to permeate through, leaving behind sheets/flakes and the binder. As a dry process, the directed sheet/flake spray-up process utilizes an air-assisted flake/binder spraying gun, which conveys flakes/sheets and an optional binder to a molding tool (e.g., a perforated metal screen shaped identical or similar to the part to be molded). Air goes through perforations, but the solid components stay on the molding tool surface.

Each of these routes can be implemented as a continuous process. For instance, the process begins with pulling a substrate (porous sheet) from a roller. The moving substrate receives a stream of slurry (as described in the above-described slurry molding route) from above the substrate. Water sieves through the porous substrate with all other ingredients (a mixture of graphene sheets or graphite flakes, optional conductive fillers, and an optional binder) remaining on the surface of the substrate being moved forward to go through a compaction stage by a pair of compaction rollers. Heat may be supplied to the mixture before, during, and after compaction to help cure the thermoset binder for retaining the shape of the resulting web or mat. The web or mat, with all ingredients held in place by the thermoset binder, may be stored first (e.g., wrapped around a roller). Similar procedures may be followed for the case where the mixture is delivered to the surface of a moving substrate by compressed air, like in a directed fiber/binder spraying process. Air will permeate through the porous substrate with other solid ingredients trapped on the surface of the substrate, which are conveyed forward. The subsequent operations are similar than those involved in the slurry molding route.

Mixing of Zinc Ion Intercalation Compound with Conductive Graphene or Exfoliated Graphite The zinc ion intercalation compound may be mixed with sheets of a graphene material or exfoliated graphite before, during, or after the formation (preparation) of this compound. In a straightforward manner, one can simply mix powder of the Zn ion intercalation compound ($MoS_2$ and $MnO_2$) with graphene sheets or exfoliated graphite flakes in a liquid medium, which is then homogenized. An optional binder resin may be added to the resulting slurry. The slurry can then be cast over a glass surface or coated on an intended current collector (e.g. Al foil). By removing this liquid medium one obtains the dried mixture.

Alternatively, one can produce a porous first, which is followed by addition of a zinc ion intercalation compound. Specifically, once a layer of porous structure (e.g. a porous sheet, paper, web, film, fabric, non-woven, mat, aggregate, or foam having pores of 1-100 nm in size) is prepared, this layer can be impregnated with a desired amount of zinc ion intercalation compound (prepared in advance) or its precursor (to be concurrently or subsequently converted into the intercalation compound) using several techniques:

The dip-coating technique is simple and effective and can be fully automated. In an embodiment, a proper amount of the zinc intercalation compound is dissolved in a suitable solvent up to 0.1-10% by weight (typically <5%) to form a solution. A porous film (paper, web, fabric, foam, etc.) can be fed from a feeder roller and immersed into a bath containing such solution and emerged from this path, allowing the solvent to be removed before the impregnated porous film is wound on a winding roller. With a proper pore size range (preferably 2-50 nm) and surface chemical state of the conducting material (e.g. graphene surface, exfoliated graphite flake surface, etc.), species of intercalation compound or its precursor readily migrates into the pores and deposit, as a coating or nano particles, onto pore internal wall surfaces (or internal graphene domain surfaces), or simply precipitates out as nano particles residing in the pores of the porous structure. This is a roll-to-roll or reel-to-reel process and is highly scalable. In other words, the active cathode layer can be mass produced cost-effectively.

The liquid dispensing and coating technique is also simple and effective, and can be automated as well. Again, a layer of porous structure can be fed from a feeder roller and collected on a winding roller. Between these two ends, a solution or suspension (containing the zinc intercalation compound or its precursory dissolved/dispersed in a liquid solvent) is dispensed and deposited on one or both surfaces of a porous structure. Heating and/or drying provisions are also installed to help remove the solvent, allowing the compound or precursor species to permeate into the porous structure and precipitate out as a nano coating or nano particles. A broad array of dispensing/depositing techniques can be used; e.g. spraying (aerosol spraying, ultrasonic spraying, compressed air-driven spraying, etc.), printing (inkjet printing, screen printing, etc.), and coating (slot-die coating, roller coating, etc.). This is a highly scalable, roll-to-roll process.

Operational Principles of the Zinc Ion-Exchanging Battery Device

As illustrated in FIG. 1, a new cell (just fabricated, upper left side of FIG. 1) contains chips or foil of Zn or Zn alloy at the anode. During the first discharge operation of the battery cell, Zn metal or alloy get electrochemically ionized and the resulting Zn ions get dissolved into the liquid electrolyte. The $Zn^{+2}$ ions swim through the liquid electrolyte and reach the cathode side where there are ultras-thin Zn intercalation compound particles or coating deposited on the massive surfaces of graphene sheets/platelets or exfoliated graphite (EG) flakes. When the discharge process continues, some $Zn^{+2}$ ions intercalate into the bulk of the intercalation compound (e.g. $MnO_2$) and other $Zn^{+2}$ ions get captured by functional groups and/or stored on the surfaces of these sheets/platelets/flakes until either the Zn metal or alloy at the anode is exhausted or the functional groups and active graphene/EG surfaces are fully occupied (right side of FIG. 1).

During a subsequent re-charging process, some $Zn^{+2}$ ions undergo solid state diffusion to migrate out of the bulk of the intercalation compound and some other $Zn^{+2}$ ions rapidly get released from the surfaces or functional groups (no solid state diffusion required). The freed $Zn^{+2}$ ions swim back to the anode side and re-deposit back onto the anode current collector (e.g. a Cu foil or a nanostructure of graphene sheets and/or carbon nano-fibers) or surfaces of the un-used Zn foil, if any).

Theoretical Aspects of the Zn Ion-Exchanging Cell (Zinc Ion Diffusion Kinetics)

Not wishing to be constrained by any theory, but we would like to offer the following theoretical considerations that perhaps are helpful to the readers. We will provide some insight as to how surface-enabled zinc ion-exchanging battery devices operate, and why such batteries exhibit exceptional power densities un-matched by conventional lithium-ion and alkaline manganese batteries. The power densities of these surface-enabled devices are even surprisingly higher than those of conventional supercapacitors. We will also shed some light on why the diameter or thickness of the Zn ion intercalation compound plays such a critical role in dictating the power density in such a dramatic manner.

For illustration purpose, we will use the internal structure of a conventional lithium-ion battery or conventional zinc-ion battery as an example. In a battery discharge situation, lithium ions must diffuse out of an anode active material particle, such as hard carbon or graphite solid particles (particle diameter=$d_a$ and the average solid-state diffusion distance=$d_a/2$), and then diffuse in liquid electrolyte across the anode thickness (anode layer thickness=La and the average diffusion distance=La/2). Subsequently, lithium ions must move (in liquid electrolyte) across a porous separator (thickness=Ls), diffuse across part of the cathode thickness (thickness=Lc) in liquid electrolyte to reach a particular cathode active material particle (average diffusion distance=Lc/2), and then diffuse into the bulk of a particle (diameter=$d_c$ and the average solid-state diffusion distance required=$d_c/2$). In a re-charge situation, the sodium ions move in the opposite direction, but must travel approximately the same distances. It may be noted that, in general, diffusion through a liquid is fast and diffusion through a solid is slow. The differences in diffusion rates are one important factor that differentiates the new battery device from the conventional sodium ion battery or zinc ion battery.

Assume that the diffusion coefficient of metal ions in a particular medium is D and a required travel distance is x, then the required diffusion time will be t~$x^2$/D, according to a well-known kinetics equation. As a first-order of approximation, the total required time scale for a sodium ion to complete a charge or discharge process may be given as:

$$t_{total}=(La/2)^2/D_{electrolyte}+(d_a/2)^2/D_a+(Ls)^2/D_s+(Lc/2)^2/D_{electrolyte}+(d_c/2)^2/D_c \quad (1)$$

where $D_{electrolyte}$=metal ion diffusion coefficient in electrolyte, $D_a$=metal ion diffusion coefficient in an anode active material particle, $D_s$=metal ion diffusion coefficient through a porous separator, and $D_c$=metal ion diffusion coefficient in a cathode active material particle.

Representative diffusion coefficients of $Li^+$ or $Zn^{+2}$ in or through various liquid mediums or solid membrane or particles are given below (based on open literature data and our best estimates): liquid electrolyte ($1.0\times10^{-7}$ $cm^2/s$); separator ($7.5\times10^{-7}$ $cm^2/s$); cathode intercalation compound ($10^{-14}$ to $10^{-12}$ $cm^2/s$); graphite particle ($10^{-10}$ to $10^{-9}$ $cm^2/s$); and hard carbon anode ($3\times10^{-11}$ $cm^2/s$). The cathode thickness=100 μm, separator thickness=10 μm, anode layer (in Li-ion cell) thickness=100 μm unless otherwise specified.

Figure 10:
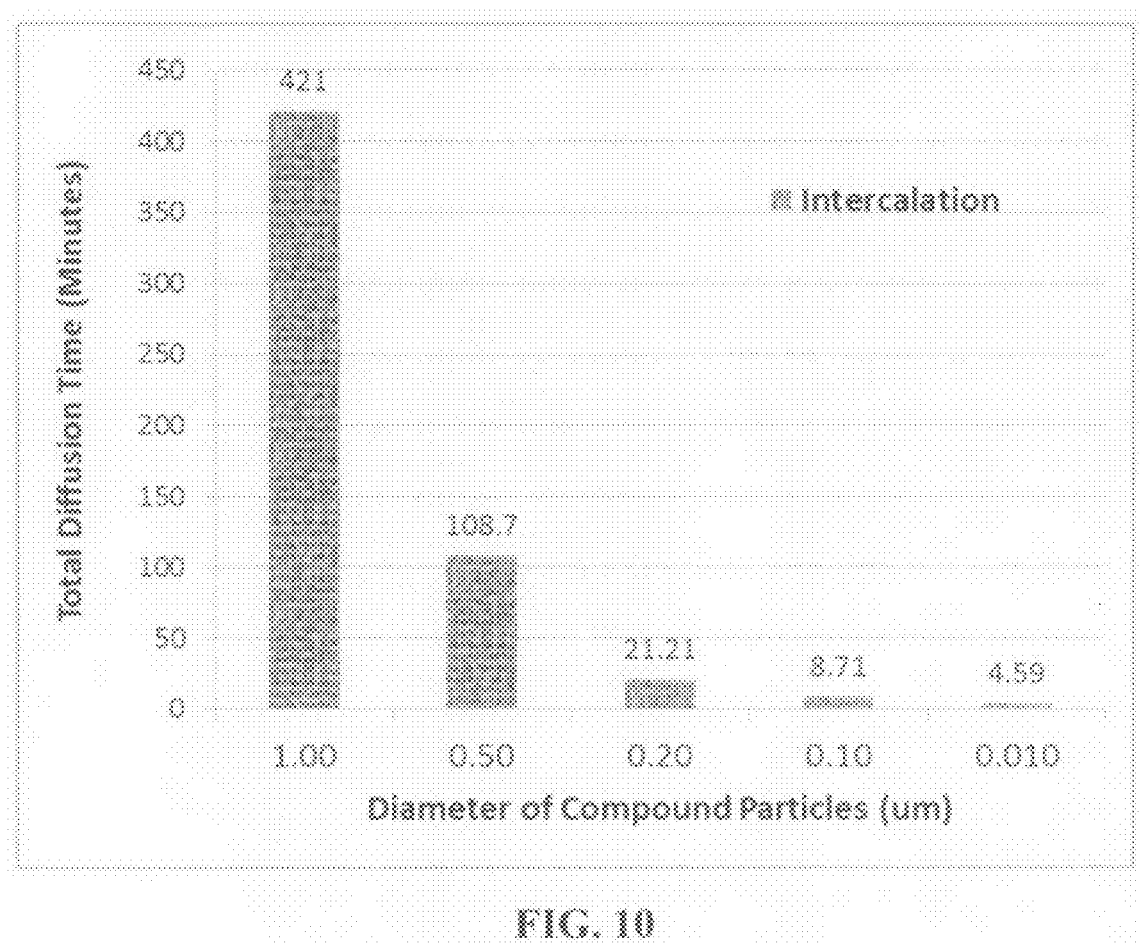
FIG. 10 Estimated total diffusion times plotted as a function of the zinc ion intercalation compound diameter (as a cathode active material) in a zinc ion-exchanging battery.

This implies that, for a conventional lithium-ion battery cell wherein $LiFePO_4$ particles are used as a cathode active material and solid graphite particles as the anode active material, second term, $(d_a/2)^2/D_a$, and the final term, $(d_c/2)^2/D_c$, in Eq. (1) dictate the required total diffusion time due to the excessively low solid-state diffusion coefficients. As illustrated in FIG. 10, the total diffusion time for lithium ions to migrate from the anode active material to the cathode active material varies between 12.7 and 946 minutes if the diameter of $LiFePO_4$ particles increases from 0.01 μm (10 nm) to 1.5 μm, given the same graphite particle size of 1 μm. Typically, with an average $LiFePO_4$ primary particle size of 500 nm, the required re-charge time would be 112 minutes.

Figure 9:
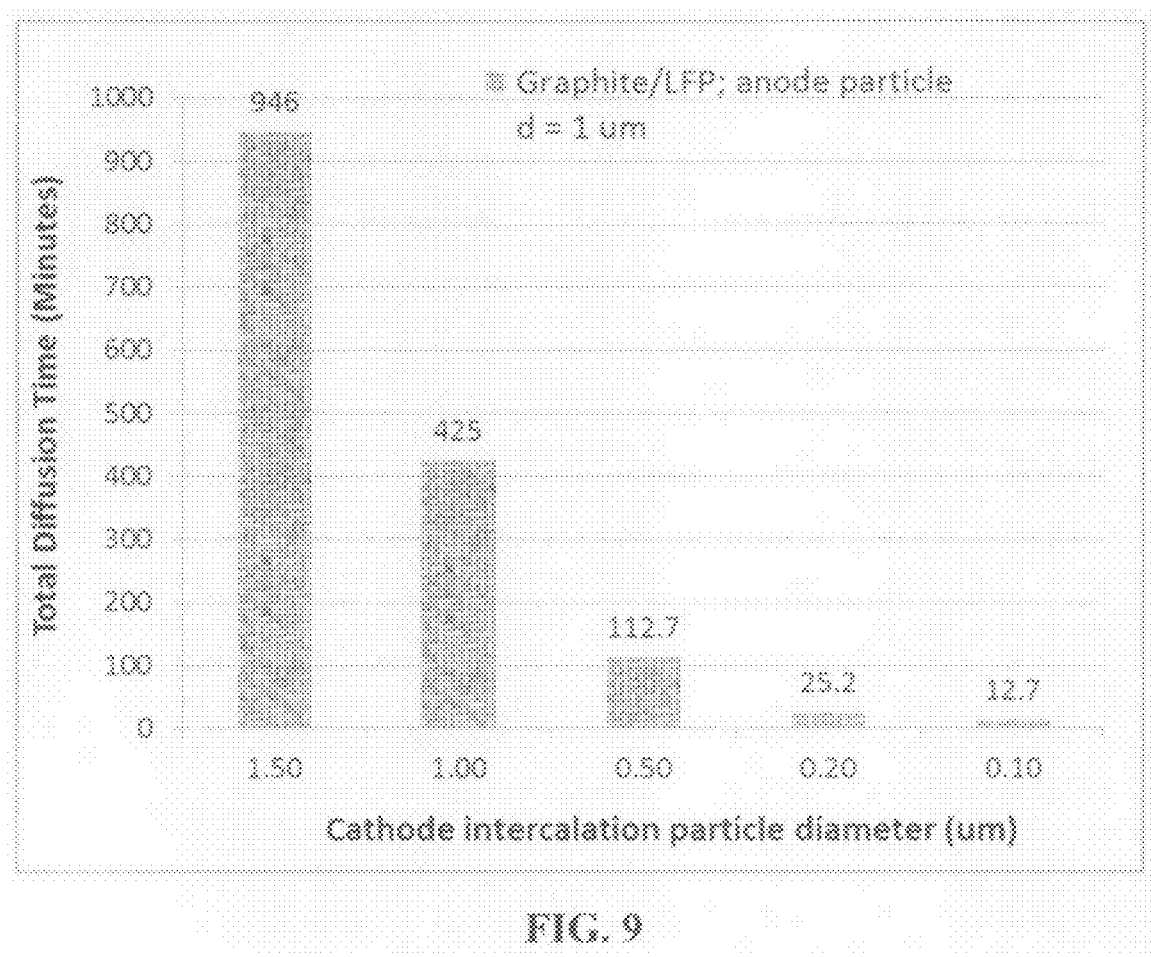
FIG. 9 Estimated total diffusion times plotted as a function of the particle size of a lithium iron phosphate cathode active material for a lithium-ion battery with a graphite anode material (particle size=1 μm).

As illustrated in FIG. 9, if the same $LiFePO_4$ particles are used as the cathode active material (diameter=1 μm) and the anode active material (graphite) diameter is varied between 0.01 μm and 10 μm, the required diffusion times would vary from 425 to 446 minutes (>7 hours). Such a long re-charge time is one of the major shortcomings of current lithium-ion batteries for electric vehicle applications.

In the presently invented zinc ion-exchanging battery device, the cathode is composed of two types of cathode active materials: a meso-porous structure of a functionalized nano graphene or exfoliated graphite (surface-mediating) and a zinc ion intercalation compound (e.g. $MnO_2$). The anode active material is Zn alloy. The two types of cathode active materials will require two different re-charge time scales. As shown in FIG. 10, if the intercalation compound diameter is varied from 1 μm to 0.01 μm (10 nm), the required recharge time goes from 421 minutes to 4.59 minutes. We are surprised to observe that zinc ion intercalation compounds (e.g. $MnO_2$) can be readily reduced to <10 nm in the presence of certain types of graphene sheets.

Figure 11:
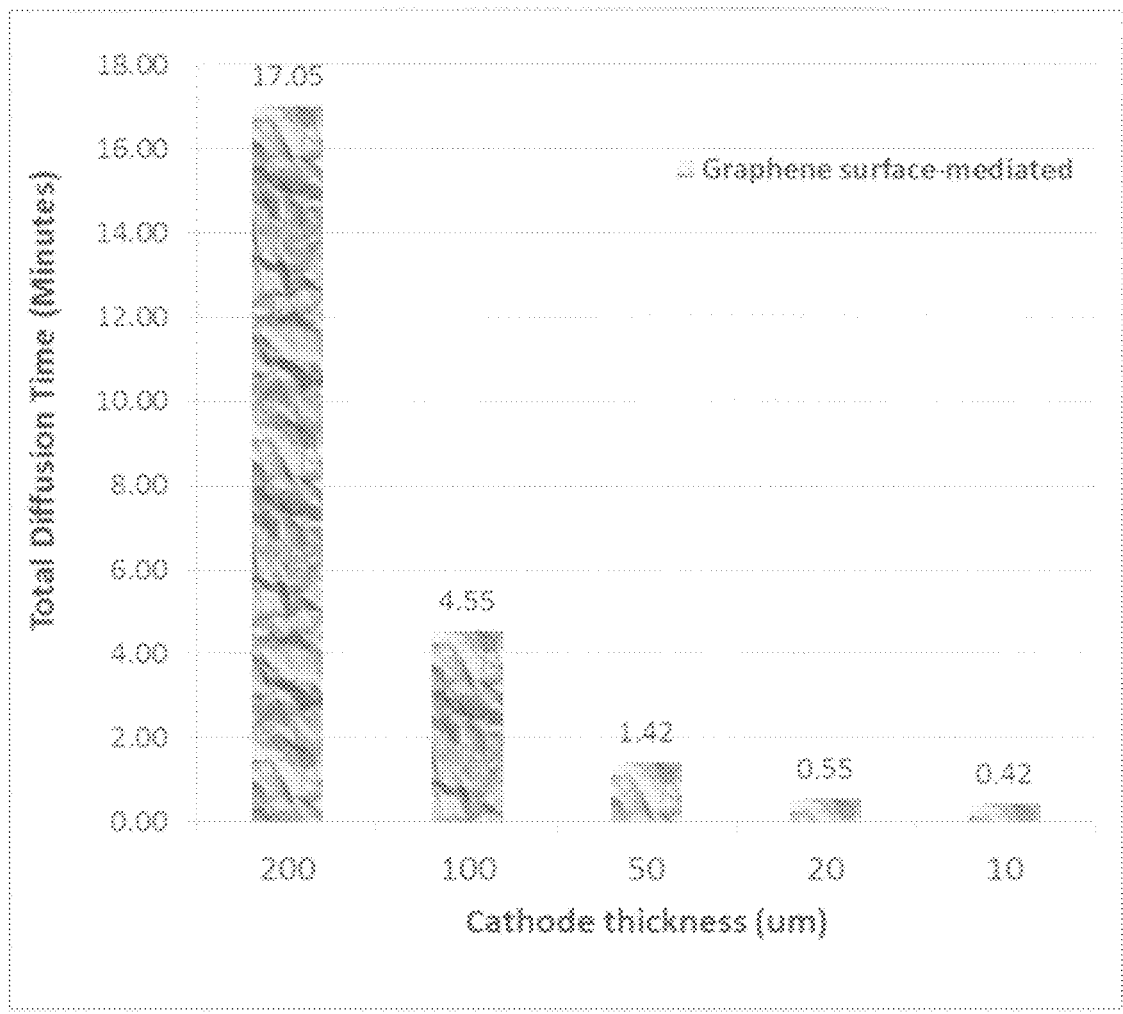
FIG. 11 Estimated total diffusion times plotted as a function of the cathode layer thickness (graphene-based surface-mediating material) in a zinc ion-exchanging battery.

The required diffusion times are even shorter if the surface-mediating material (e.g. graphene) is considered. As illustrated in FIG. 11, such a surface-enabled, zinc ion-exchanging battery would require a diffusion time as short as 4.55 minutes when the cathode thickness is 100 μm. This is comparable to the required total diffusion time for the case of a zinc intercalation compound. Since the cathode contains both types of active materials, the overall recharge time would be approximately 4.59 minutes.

In this type of zinc ion-exchanging battery containing a meso-porous cathode of a functionalized nano graphene (and a nano-scaled intercalation compound bonded thereon) and a zinc metal foil as the anode, $Zn^{2+}$ ions do not have to diffuse through a large solid-state cathode particle and, hence, are not subject to the limitation by a low solid-state diffusion coefficient at the cathode (e.g. $10^{-14}$-$10^{-12}$ $cm^2/s$). Instead, the presently invented nano-structured cathode active materials are highly porous, allowing liquid electrolyte to reach the interior of the pores where the functional groups are present to readily and reversibly react with zinc ions that diffuse into these pores through a liquid medium (not a solid medium) with a high diffusion coefficient (e.g., $2\times10^{-7}$ $cm^2/s$). In such a battery device, the final term, $(d_c/2)^2/D_c$, in Eq. (1) is practically non-existing. The required total diffusion time is now dictated by the thicknesses of the electrodes and the separator. The above discussion is based on the premise that the reversible reaction between a functional group and a sodium ion in the electrolyte is fast, and the whole charge-discharge process is not reaction-controlled.

The present invention also provides a zinc ion-exchanging battery device comprising no surface-mediating material (e.g. no graphene sheets) in the cathode. This battery device comprises: (A) a positive electrode or cathode comprising a zinc ion intercalation compound as a cathode active material, an optional binder, and an optional cathode current collector; (B) a negative electrode or anode containing zinc metal or zinc alloy (optionally supported by a nano-structured current collector); (C) a porous separator disposed between the cathode and the anode; and (D) a non-aqueous or aqueous electrolyte in physical contact with the cathode and the anode, wherein the electrolyte contains zinc ions that are exchanged between the cathode and the anode during a charge and discharge operation of the battery device. The zinc ion intercalation compound has inter-planar spaces sufficiently large to reversibly intercalate/deintercalate zinc ions and is selected from chemically treated carbon or graphite material having an expanded inter-graphene spacing $d_{002}$ of at least 0.5 nm, zinc hydroxide salt, or an oxide, carbide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof; wherein manganese oxide is in a nanowire form.

The following examples serve to illustrate the preferred embodiments of the present invention and should not be construed as limiting the scope of the invention:

EXAMPLE 1

Preparation of Graphene Oxide (GO) and Reduced Graphene Oxide (RGO) Nano Sheets from Natural Graphite Powder and their Paper/Mats (Layers of Porous Structure)

Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt. % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt. % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

These suspensions (GO in water and RGO in surfactant water) were then filtered through a vacuum-assisted membrane filtration apparatus to obtain porous GO and RGO paper or mat. The porous paper/mat was used to support some precursors to the zinc ion intercalation compounds intended for use in the cathode. In some examples, the paper/mat was also used as a porous nano-structured anode to support zinc metal or alloy at the anode.

EXAMPLE 2

Preparation of Discrete Functionalized GO Sheets from Graphite Fibers and Porous Films of Chemically Functionalized GO Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and the suspensions were allowed to stay in the container without any mechanical disturbance for 2 days, forming liquid crystalline phase in the water-alcohol liquid when alcohol is being vaporized at 80° C.

The resulting suspensions containing GO or f-GO liquid crystals were then cast onto glass surface using a doctor's blade to exert shear stresses, inducing GO sheet orientations. The resulting GO or f-GO coating films, after removal of liquid, have a thickness that can be varied from approximately 10 to 500 μm. Some of the resulting GO films were then subjected to heat treatments that involve an initial thermal reduction temperature of 80-350° C. for 8 hours, followed by heat-treating at a second temperature of 1,500-2,850° C. for different specimens to obtain various porous graphitic films. Other GO films were used to host the precursor to the zinc ion intercalation compound (e.g. $MnO_2$). We found that the presence of GO could significantly reduce the particle sizes of these compounds being formed in situ.

EXAMPLE 3

Preparation of Single-Layer Graphene Sheets and Porous Graphene Mats from Meso-Carbon Micro-Beads (MCMBs)

Meso-carbon micro-beads (MCMBs) were supplied from China Steel Chemical Co., Kaohsiung, Taiwan. This material has a density of about 2.24 g/cm$^3$ with a median particle size of about 16 μm. In one example, MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The suspension was then diluted to approximately 0.5% by weight in a container and was allowed to age therein without mechanical disturbance. The suspension was then slightly heated (to 65° C.) to vaporize the water under a vacuum-pumping condition. The formation of liquid crystalline phase became more apparent as water was removed and the GO concentration was increased. The final concentration in this sample was set at 4% by weight. The dispersion containing liquid crystals of GO sheets was then cast onto a glass surface using a doctor's blade to exert shear stresses, inducing GO sheet orientations. The resulting GO films, after removal of liquid, have a thickness that can be varied from approximately 10 to 500 μm. The resulting GO compact was then subjected to heat treatments to produce porous structures. These treatments typically involve an initial thermal reduction temperature of 80-500° C. for 1-5 hours, optionally followed by heat-treating at a second temperature of 1,500-2,850° C. These porous films can be used to accommodate the zinc ion intercalation compound at the cathode and/or to support zinc metal or alloy at the anode.

EXAMPLE 4

Preparation of Pristine Graphene Sheets/Platelets (0% Oxygen) and the Effect of Pristine Graphene Sheets Recognizing the possibility of the high defect population in GO sheets acting to reduce the conductivity of individual graphene plane, we decided to study if the use of pristine graphene sheets (non-oxidized and oxygen-free) can lead to a HOGF having a higher thermal conductivity. Pristine graphene sheets were produced by using the direct ultra-sonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. The suspension (with or without added ion intercalation compound particles) was then filtered via vacuum-assisted filtration to obtain porous paper structures. These porous structures were used as a surface-mediating material at the cathode. In several cells, these nano-structures were used to support Zn metal to enable fast capturing and releasing of Zn ions during charging and discharging.

EXAMPLE 5

Preparation of Fluorinated Graphite with Expanded Inter-Planar Spacing, Graphene Fluoride Nano Sheets and Porous Graphene Structure from these Sheets Several processes have been used by us to produce fluorinated graphite particles and, subsequently, graphene fluoride (GF) sheets, but only one process is herein described as an example. In a typical procedure, intercalated compound $C_2F.xClF_3$ was further fluorinated by vapors of chlorine trifluoride to yield fluorinated graphite (FG). Specifically, pre-cooled Teflon reactor was filled with 20-30 mL of liquid pre-cooled $ClF_3$; the reactor was closed and cooled to liquid nitrogen temperature. Then, 0.5 g of lightly fluorinated graphite was put in a container with holes for $ClF_3$ gas to access and situated inside the reactor. In 7-10 days a gray-beige product with approximate formula $C_2F$ was formed. Depending upon the reaction time, the inter-planar spacing ($d_{002}$, as measured by X-ray diffraction) was varied from approximately 0.55 nm to 0.97 nm. Portion of these graphite fluoride particles was used as a zinc ion intercalation compound due to their expanded inter-planar spaces being surprisingly conducive to entry by zinc ions.

Subsequently, a desired amount of graphite fluoride (approximately 0.5 g) was mixed with 20 L of an organic solvent (methanol, ethanol, 1-propanol, 2-propanol, or 1-butanol) and subjected to an ultrasound treatment (280 W) for 30 min, leading to the formation of homogeneous yellowish dispersions. Five minutes of sonication was enough to obtain a relatively homogenous dispersion of few-layer graphene fluoride, but longer sonication times ensured the production of mostly single-layer graphene fluoride sheets. Some of these suspension samples were subjected to vacuum oven drying to recover separated graphene fluoride sheets. These graphene fluoride sheets were then added into a polymer-solvent or monomer-solvent solution to form a suspension. Various polymers or monomers (or oligomers) were utilized as the precursor film materials for subsequent carbonization and graphitization treatments.

Upon casting on a glass surface with the solvent removed, the dispersion became a brownish film formed on the glass surface. When these GF-reinforced polymer films were heat-treated, some fluorine and other non-carbon elements were released as gases that generated pores in the film. The resulting porous graphitic films had physical densities from 0.33 to 1.22 g/cm$^3$. These porous graphitic films were then roll-pressed to obtain graphitic films (porous structures) having a density from 0.8 to 1.5 g/cm$^3$ for use as a surface-mediating material at the cathode. An ion intercalation compound precursor salt was then impregnated into pores of a porous GF structure using a dip coating procedure.

EXAMPLE 6

Preparation of Nitrogenataed Graphene Nano Sheets and Porous Graphene Structures Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenataed graphene sheets remain dispersible in water. A zinc ion intercalation compounds ($MnO_2$ and $MoS_2$, respectively) was added into the nitrogenataed graphene-water suspension to form a pot of slurry. The resulting slurries were then cast and dried to produce porous graphene structures, which were used as a surface-mediating material at the cathode.

EXAMPLE 7

Exfoliated Graphite Worms from Natural Graphite

Natural graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms. Some of the graphite worms were then roll-pressed to obtain samples of re-compressed exfoliated graphite having a range of physical densities (e.g. 0.3 to 1.2 g/cm³). These porous, re-compressed structures were then impregnated with an intercalation compound. Some of the graphite worms were subjected to low-intensity sonication to produce expanded graphite flakes. These expanded graphite flakes, with or without an ion intercalation compound, were then made into a porous paper form using the vacuum-assisted filtration technique.

EXAMPLE 8

Exfoliated Graphite Worms from Various Synthetic Graphite Particles or Fibers

Additional exfoliated graphite worms were prepared according to the same procedure described in Example 1, but the starting graphite materials were graphite fiber (Amoco P-100 graphitized carbon fiber), graphitic carbon nano-fiber (Pyrograph-III from Applied Science, Inc., Cedarville, Ohio), spheroidal graphite (HuaDong Graphite, QinDao, China), and meso-carbon micro-beads (MCMBs) (China Steel Chemical Co., Taiwan), respectively. These four types of laminar graphite materials were intercalated and exfoliated under similar conditions as used for Example 1 for different periods of time, from 24 hours to 96 hours.

Some amount of the graphite forms was then roll-pressed to obtain samples of re-compressed exfoliated graphite having a range of physical densities (e.g. 0.3 to 1.2 g/cm³). A second amount of the graphite worms was subjected to low-intensity sonication to produce expanded graphite flakes. These expanded graphite flakes were then made into a paper form (the porous structure) using the vacuum-assisted filtration technique. The porous paper structure was used as a surface-mediating material at the cathode.

EXAMPLE 9

Exfoliated Graphite Worms from Natural Graphite Using Hummers Method

Additional graphite intercalation compound (GIC) was prepared by intercalation and oxidation of natural graphite flakes (original size of 200 mesh, from Huadong Graphite Co., Pingdu, China, milled to approximately 15 μm) with sulfuric acid, sodium nitrate, and potassium permanganate according to the method of Hummers [U.S. Pat. No. 2,798, 878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately three hours at 30° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes.

Some of the graphite forms were then roll-pressed to obtain samples of re-compressed exfoliated graphite having a range of physical densities (e.g. 0.3 to 1.2 g/cm³). Some of the graphite worms were subjected to low-intensity sonication to produce expanded graphite flakes. These expanded graphite flakes were then made into a porous paper form using the vacuum-assisted filtration technique. The porous paper structure was used as a surface-mediating material at the cathode.

EXAMPLE 10

Preparation of $MoS_2$/RGO Hybrid Cathode Material

Ultra-thin $MoS_2$/RGO hybrid was synthesized by a one-step solvothermal reaction of $(NH_4)_2MoS_4$ and hydrazine in an N, N-dimethylformamide (DMF) solution of oxidized graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 ml of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was re-dispersed in 5 ml of DI water, frozen by liquid nitrogen and lyophilized overnight. The hybrid material was made into a layer of electrode (a cathode) for inclusion in the Zn ion exchanging cell. $MoS_2$ was also prepared without the presence of graphene sheets for use in the metal ion-exchanging batteries without a surface-mediating material in the cathode.

EXAMPLE 11

Preparation of Two-Dimensional (2D) Layered $Bi_2Se_3$ Chalcogenide Nanoribbons as a Cathode Active Material The preparation of (2D layered $Bi_2Se_3$ chalcogenide nanoribbons is well-known in the art. For instance, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were found to have sharp edges and high crystallinity, which enable maximum intercalation by zinc ions. The 2D layered $Bi_2Se_3$ was prepared for use in the metal ion-exchanging batteries with or without a surface-mediating material in the cathode.

EXAMPLE 12

MXenes as Examples of a Zinc Intercalation Compound

Several members of a novel family (MXenes) of 2D metal carbides or metal carbonides were produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (0, OH, and/or F), n=1, 2, or 3, and x is the number of terminating groups. The MXene materials investigated include $Ti_2CT_x$, $Nb_2CT_x$, $V_2CT_x$, $Ti_3C_2T_x$, $Ti_3CNT_x$, $Ta_4C_3T_x$, and $Nb_4C_3T_x$. These materials were surprisingly found to be capable of accommodating zinc ions in their inter-layer channels. The layered MXene materials were prepared for use in the metal ion-exchanging batteries with or without a surface-mediating material in the cathode.

EXAMPLE 13

Preparation of Various $MnO_2$-Graphene Cathodes

The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution was added in the solution, which was ultrasonicated for 30 min to prepare a dark brown precipitate. The product was separated, washed several times with distilled water and ethanol, and dried at 80° C. for 12 h. The sample is denoted as A-$MnO_2$.

Separately, graphene oxide sheets dispersed in water (solid contents of 0.5-2% by weight) were added to the $KMnO_4$ solution with an intended $MnO_2$/GO ratio from 1/20 to 20/1. The resulting hybrid material was used as the two cathode active materials in the zinc ion-exchanging cell. In the chemical co-precipitation technique, typically a 0.1 mol/L $KMnO_4$ solution was prepared by dissolving potassium permanganate in deionized water. While stirring the solution, a 0.15 mol/L $Mn(CH_3COO)_2$ was quickly added with the $KMnO_4$/$Mn(CH_3COO)_2$ molar ratio of 2:3. A dark brown precipitate was immediately obtained according to:

$$2Mn(VII) + 3Mn(II) \rightarrow 5Mn(IV) \qquad (2)$$

The solution was then stirred for 4 h until the reaction was completed. The product was separated, rinsed several times with double distilled water, and dried at 80° C. for 12 h. The sample is denoted as B—$MnO_2$.

The Zn-graphene/$MnO_2$ battery is composed of a graphene/$MnO_2$-based cathode (with an optional cathode current collector and an optional conductive filler), a Zn metal or alloy-based anode (with an optional anode current collector), and an aqueous electrolyte (e.g. a mixture of a mild $ZnSO_4$ or $Zn(NO_3)_2$ with $MnSO_4$ in water).

These two methods have given us an opportunity to conduct an extensive and in-depth study about the zinc ion-exchanging batteries. At the anode side and in a mild aqueous solution containing $Zn^{2+}$ ions, zinc can rapidly get electrochemically dissolved as $Zn^{2+}$ ion in water during battery discharging and get re-deposited back to the anode during battery recharging. This highly reversible process can deliver a theoretical capacity of 820 mAhg/g at the anode (based on zinc weight). At the cathode side, $Zn^{2+}$ ions can be reversibly intercalated into inter-planar spaces of α-$MnO_2$ in the same mild electrolyte system, which provides a large capacity of 210 mAh/g based on the α-$MnO_2$ weight. However, a combination of α-$MnO_2$ and graphene sheets with massive Zn ion-capturing surface areas were found to deliver a cathode capacity that far exceeds what is theoretically predicted.

EXAMPLE 13

Preparation of $MnO_2$ Nanowires

To synthesize α-$MnO_2$ nanowires with different exposed planes, two different hydrothermal reaction processes were employed in Teflon-lined autoclaves. Rectangular $MnO_2$-110 (wherein (110) plane was exposed) was synthesized by a hydrothermal method with the following procedures: $KMnO_4$ (Aldrich, 99.0%) and $NH_4F$ (Aldrich, 99.99%) were used to form α-$MnO_2$ under neutral hydrothermal conditions. In a typical procedure, $KMnO_4$ (0.001 mol) and $NH_4F$ (0.001 mol) were dissolved under magnetic stirring in 40 mL doubly deionized water to form a clear solution. The solution was transferred into a 50 mL autoclave with a Teflon liner. The autoclave was sealed and maintained at 150° C. for 24 h, and then cooled to room temperature naturally. The suspension was then alternately centrifuged with doubly deionized water and ethanol several times, and the resulting brown precipitate was dried in an oven at 80° C. for 10 h.

Rectangular $MnO_2$-210 was synthesized with a $Mn^{2+}$ source: $Mn^{2+}$ $(NH_4)_2S_2O_8+2H_2O \rightarrow MnO_2+(NH_4)_2SO_4+2H_2SO_4$. $H_2SO_4$ was added to the solution to adjust its pH value, since the size and morphology of the nanostructures show a strong dependence on the pH value of the formation environment. In a typical synthesis, $MnCO_3$ (Aldrich, 99.9%), $(NH_4)_2S_2O_8$ (Aldrich, >98%), $HNO_3$ (>90%), and $H_2SO_4$ (Aldrich, 95-98%) were used as received without further purification. $MnCO_3$ (0.02 mol) was dispersed in deionized water (200 mL), and $HNO_3$ (0.04 mol) was then added to make a transparent solution. Then, $(NH_4)_2S_2O_8$ (0.02 mol) was added, and the solution was diluted to 300 mL. After the addition was completely dissolved, concentrated $H_2SO_4$ (20 mL) was added, and the solution was diluted to 400 mL and stirred for 30 min. The hydrothermal treatment was performed in a Teflon-lined autoclave, with heating at 140° C. for 1 hour. After the reaction was completed, the solution was cooled to room temperature, and the resulting suspension was centrifuged in order to separate the precipitate from the supernatant liquid. The precipitate was washed and centrifuged two times and then dried at 80° C. overnight.

Figure 12:
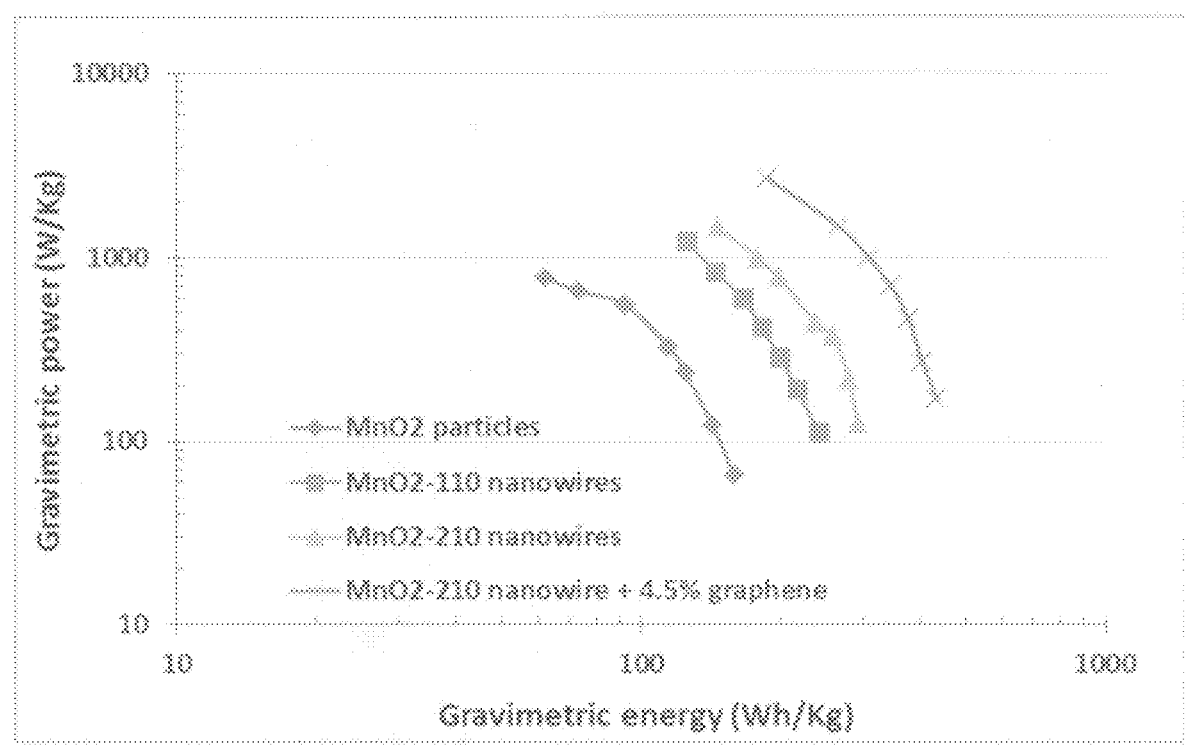
FIG. 12 Ragone plots for four different Zn ion-exchanging batteries containing $MnO_2$ particles, $MnO_2$-110, $MnO_2$-210, and $MnO_2$-210/4.5% graphene as the cathode active materials, respectively.

Both $MnO_2$-110 and $MnO_2$-210 nanowires were found to be good zinc ion intercalation compounds, delivering higher power densities than do α-$MnO_2$ particles (e.g. FIG. 12). This might be due to certain exposed lattice plane edges being more conducive to zinc ion diffusion. FIG. 12 also indicates that $MnO_2$-110 and $MnO_2$-210 nanowires, even without graphene sheets, exhibit very good energy densities and power densities. However, the addition of a mere 4.5% of graphene sheets has significantly increased both the energy density and power density. Clearly, such a combination exhibits some kinds of synergistic effects.

EXAMPLE 14

Layered Zinc Hydroxide Salts Enclosed by Graphene Sheets as the Hybrid Cathode Material The structural arrangements of dodecyl sulfate (DS) anions in the interlayer space of layered zinc hydroxide salts (LZH-DS) and of the structure of zinc hydroxide layers were investigated. As-prepared, highly crystalline LZH-DS has a basal spacing of 31.5 Å (3.15 nm). After treatment with methanol at room temperature, zinc hydroxide layers shrank to form two new layered phases with basal spacings of 26.4 and 24.7 Å. The shrinking was accompanied by a decrease in the content of DS anions in the interlayer space, indicating a change in the alignment of the intercalated anions and a decrease in the charge density of the zinc hydroxide layers. This study indicates that tetrahedra Zn ions can be reversibly removed from the hydroxide layers, with the octahedrally coordinated Zn ions left unaffected. This result suggests that layered zinc hydroxide can be used as a Zn intercalation compound.

EXAMPLE 15

Hydrothermal Synthesis of Graphene-Enabled $Zn_xV_2O_5$ Nano-Belts from $V_2O_5$, $ZnCl_2$, and Graphene Oxide In a typical experiment, vanadium pentoxide gels were obtained by mixing $V_2O_5$ in a $ZnCl_2$ aqueous solution. The $Zn^{+2}$-exchanged gels obtained by interaction with $ZnCl_2$ solution (the Zn:V molar ratio was kept as 1:1), with or without mixing by a GO suspension, were placed in a Teflon-lined stainless steel 35 ml autoclave, sealed, and heated up to 180° C. for 8-24 h. After such a hydrothermal treatment, the green solids were collected, thoroughly washed, optionally ultrasonicated, and dried at 70° C. for 12 h followed by either (a) drying at 200° C. under vacuum overnight to obtain paper-like lamella composite structures or (b) mixing with another 0.1% GO in water, ultrasonicating to break down nano-belt sizes, and then spray-drying at 200° C. to obtain graphene-embraced composite particulates. These composite particulates contain two types of cathode active materials: zinc intercalation and surface-mediating.

EXAMPLE 16

Electrochemical Performance of Various Zn Ion-Exchanging Batteries

Fully surface-enabled coin cells using a functionalized graphene mat and several intercalation compounds as the cathode active material and a graphene/CNT-based nanostructured anode (plus a small piece of Zn foil as a Zn ion source implemented between the graphene/CNT nanostructured current collector and a separator layer) were made and tested. The separator was one sheet of micro-porous membrane (Celgard 2500). The current collector for the cathode was a piece of carbon-coated aluminum foil. The electrolyte solution was 1 M of a mixture of $ZnSO_4$ and $MSO_4$ (where M=Co, Mn, Fe, Ni, or Ti). The separator was wetted by a minimal amount of electrolyte to reduce the background current. Cyclic voltammetry and galvanostatic charge-discharge measurements of the potassium cells were conducted using an Arbin 32-channel supercapacitor-battery tester at room temperature (in some cases, at a temperature up to 60° C. and down to −20° C.).

Galvanostatic charge-discharge studies of the fabricated Zn ion-exchanging cells have enabled us to obtain significant information:

(1) The zinc ion-exchanging battery of the present invention is a revolutionary energy storage device that fundamentally differs from a supercapacitor since an electric double layer (EDL) supercapacitor relies on the formation of double layers of charges at the electrode-electrolyte interface. In addition, the supercapacitor does not involve exchange of zinc ions between the anode and the cathode. This surface-enabled battery device also differs from conventional lithium-ion or alkali-ion batteries wherein lithium or alkali atoms (or ions) intercalate into inter-graphene spaces in a graphite particle of an anode or wherein both the anode and cathodes are based on lithium or alkali intercalation in and out of the bulk of solid intercalation compounds. The instant invention provides a revolutionary energy storage device that has or exceeds the best performance features of both the supercapacitor and the lithium ion battery.

(2) The above examples, along with chemical analysis results, suggest that the surfaces (including edges) of graphene sheets and exfoliated graphite flakes, with a proper chemical functionalization treatment, are imparted with functional groups that are capable of rapidly and reversibly react or interact with zinc ions to form surface redox pairs or chemical complexes. Such a zinc ion storage mechanism does not involve intercalation and is herein referred to as surface-mediating.

(3) The device can deliver a power density higher than that of the best supercapacitor by a factor of 5-10 and an energy density higher than that of the best supercapacitor by a factor of 20.

(4) The presently invented zinc ion-exchanging battery devices can be re-charged in minutes or seconds, as opposed to hours for conventional lithium ion batteries.

(5) It may be noted that $Zn^{2+}$ ions are relatively large in size (greater than the size of $Li^+$) and a materials scientist or electrochemist would consider it difficult or impossible to find a cathode intercalation compound that is amenable to insertion (intercalation) and extraction (de-intercalation) of these ions into/from the interior of these solid compounds. We have unexpectedly discovered several classes of cathode active materials for zinc ions. This is very significant since, as an example, each exchange of a $Zn^{2+}$ ion involves the delivery of two electrons, not just one.

(6) This surface-mediating approach basically provides a safe, fast, and tentative but stable mechanism to "store" or capture zinc ions on the surfaces or edges of graphene sheets.

(7) The presently invented zinc metal ion-exchanging battery device represents a truly major breakthrough or revolutionary energy storage technology that has tremendous utility value. The commercialization of this technology will make electric vehicle industry economically viable and, as such, will have a major, highly positive impact to the environment and society.

We claim:

1. A zinc ion-exchanging battery device comprising:
    (A) a positive electrode or cathode comprising two cathode active materials, an optional binder, and an optional cathode current collector;
    (B) a negative electrode or anode containing zinc metal or zinc alloy;
    (C) a porous separator disposed between said cathode and said anode; and
    (D) a non-aqueous or aqueous electrolyte in physical contact with said cathode and said anode, wherein said electrolyte contains zinc ions that are exchanged between said cathode and said anode during a charge and discharge operation of said battery device;
    wherein said two cathode active materials consist of (a) at least a zinc ion intercalation compound having interplanar spaces sufficiently large to reversibly intercalate/deintercalate zinc ions and (b) a surface-mediating material having a surface-borne zinc ion-capturing functional group or zinc ion-storing surfaces in direct contact with said electrolyte to reversibly capture or store zinc ions thereon during the charge and discharge operation of said battery device; and
    wherein said two cathode active materials contain a combination of $MoS_2$ and RGO, or a combination of two-dimensional layered $Bi_2Se_3$ Chalcogenide nanoribbons and said surface-mediating material.

2. The battery device of claim 1 wherein said electrolyte comprises a zinc metal salt-doped ionic liquid, aqueous electrolyte, or organic electrolyte.

3. The battery device of claim 1 wherein the electrolyte contains at least two different types of metal ions that participate in storing and releasing electrons.

4. The battery device of claim 1, wherein the electrolyte comprises at least a metal ion salt selected from a transition metal sulphate, transition metal phosphate, transition metal nitrate, transition metal acetate, transition metal carboxylate, transition metal chloride, transition metal bromide, transition metal perchlorate, transition metal hexafluorophosphate, transition metal borofluoride, transition metal hexafluoroarsenide, or a combination thereof.

5. The battery device of claim 1, wherein the electrolyte comprises at least a metal ion salt selected from zinc sulphate, zinc phosphate, zinc nitrate, zinc acetate, zinc carboxylate, zinc chloride, zinc bromide, zinc perchlorate, manganese sulphate, manganese phosphate, manganese nitrate, manganese acetate, manganese carboxylate, manganese chloride, manganese bromide, manganese perchlorate, cobalt sulphate, cobalt phosphate, cobalt nitrate, cobalt acetate, cobalt carboxylate, cobalt chloride, cobalt bromide, cobalt perchlorate, nickel sulphate, nickel phosphate, nickel nitrate, nickel acetate, nickel carboxylate, nickel chloride, nickel bromide, nickel perchlorate, iron sulphate, iron phosphate, iron nitrate, iron acetate, iron carboxylate, iron chloride, iron bromide, iron perchlorate, vanadium sulphate, vanadium phosphate, vanadium nitrate, vanadium acetate, vanadium carboxylate, vanadium chloride, vanadium bromide, vanadium perchlorate, or a combination thereof.

6. The battery device of claim 1, wherein the electrolyte comprises an organic solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA), or a combination thereof.

7. The battery device of claim 1, wherein said surface-mediating material has a functional group that reversibly reacts with a zinc ion, forms a redox pair with a zinc ion, or forms a chemical complex with a zinc ion.

8. The battery device of claim 7, wherein the cathode has a specific surface area no less than 200 $m^2/g$ and mesopores having a size from 2 to 50 nm.

9. The battery device of claim 1, wherein the zinc metal or zinc alloy comprises a zinc metal or alloy chip, foil, powder, filament, surface stabilized particle, or a combination thereof.

10. The battery device of claim 1, wherein said surface-mediating material occupies a weight fraction between 0.1% and 5% based on the combined weights of the surface-mediating material and the zinc ion intercalation compound.

11. The battery device of claim 1, wherein said surface-mediating material occupies a weight fraction between 0.1% and 50% based on the combined weights of the surface-mediating material and the zinc ion intercalation compound.

12. The battery device of claim 1, wherein said surface-mediating material occupies a weight fraction between 50% and 99% based on the combined weights of the surface-mediating material and the zinc ion intercalation compound.

13. The battery device of claim 1, wherein said surface-mediating material occupies a weight fraction between 0.1% and 99% based on the combined weights of the surface-mediating material and the zinc ion intercalation compound.

14. The battery device of claim 1 wherein said functional group is selected from —COOH, =O, —$NH_2$, —OR, or —COOR, where R is a hydrocarbon radical.

15. The battery device of claim 1 wherein said device provides a power density no less than 15 Kw/kg, all based on total battery device weight.

16. The battery device of claim 1 wherein said device provides an energy density of no less than 1,000 Wh/kg or power density no less than 20 Kw/kg, all based on total battery device weight.

17. The battery device of claim 1, wherein said anode further contains a porous anode current collector selected from a porous sheet, paper, web, film, fabric, non-woven, mat, aggregate, or foam of a carbon or graphite material selected from graphene, graphene oxide, reduced graphene oxide, graphene fluoride, doped graphene, functionalized graphene, expanded graphite with an inter-graphene spacing greater than 0.4 nm, exfoliated graphite or graphite worms, chemically etched or expanded soft carbon, chemically etched or expanded hard carbon, exfoliated activated carbon, chemically etched or expanded carbon black, chemically etched multi-walled carbon nanotube, nitrogen-doped carbon nanotube with an enhanced metal ion capturing ability, boron-doped carbon nanotube with an enhanced metal ion capturing ability, chemically doped carbon nanotube with an enhanced metal ion capturing ability, ion-implanted carbon nanotube with an enhanced metal ion capturing ability, chemically treated multi-walled carbon nanotube with an inter-graphene planar separation no less than 0.4 nm, chemically expanded carbon nanofiber, chemically activated carbon nanotube, chemically treated carbon fiber, chemically activated graphite fiber, chemically activated carbonized polymer fiber, chemically treated coke, mesophase carbon, or a combination thereof.

18. The battery device of claim 17, wherein said zinc metal or zinc alloy is preloaded or pre-coated on said porous anode current collector.

19. The battery device of claim 1, wherein said anode further contains an anode current collector which is a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nanowire mat, surface-passivated porous metal, porous conductive polymer film, conductive polymer nanofiber mat or paper, conductive polymer foam, carbon foam, carbon aerogel, carbon xerogel, graphene foam, graphene oxide foam, reduced graphene oxide foam, or a combination thereof.

20. The battery device of claim 19, wherein said zinc metal or zinc alloy is preloaded or pre-coated on said anode current collector.

* * * * *